United States Patent
Hiraoka et al.

(10) Patent No.: US 11,834,608 B2
(45) Date of Patent: Dec. 5, 2023

(54) SILICA NANOPARTICLES FOR CRUDE OIL RECOVERY USING CARBON DIOXIDE, AND CRUDE OIL RECOVERY METHOD

(71) Applicants: INPEX CORPORATION, Tokyo (JP); HIROSAKI UNIVERSITY, Hirosaki (JP); NISSAN CHEMICAL CORPORATION, Tokyo (JP)

(72) Inventors: Takashi Hiraoka, Tokyo (JP); Hideharu Yonebayashi, Tokyo (JP); Yoshihiro Miyagawa, Tokyo (JP); Masanobu Sagisaka, Hirosaki (JP); Masashi Abe, Sodegaura (JP)

(73) Assignees: INPEX CORPORATION, Tokyo (JP); HIROSAKI UNIVERSITY, Hirosaki (JP); NISSAN CHEMICAL CORPORATION, Tokyo (JP)

(*) Notice: Subject to any disclaimer, the term of this patent is extended or adjusted under 35 U.S.C. 154(b) by 0 days.

(21) Appl. No.: 17/780,419

(22) PCT Filed: Nov. 26, 2020

(86) PCT No.: PCT/JP2020/044098
§ 371 (c)(1),
(2) Date: May 26, 2022

(87) PCT Pub. No.: WO2021/107048
PCT Pub. Date: Jun. 3, 2021

(65) Prior Publication Data
US 2023/0002669 A1    Jan. 5, 2023

(30) Foreign Application Priority Data
Nov. 28, 2019  (JP) .................... 2019-215612

(51) Int. Cl.
C09K 8/594    (2006.01)

(52) U.S. Cl.
CPC .......... *C09K 8/594* (2013.01); *C09K 2208/10* (2013.01)

(58) Field of Classification Search
CPC ...... C09K 8/58; C09K 8/594; C09K 2208/10; E21B 43/16; E21B 43/164; E21B 43/166; E21B 43/168; E21B 43/20
See application file for complete search history.

(56) References Cited

U.S. PATENT DOCUMENTS

| 10,563,117 | B2 * | 2/2020 | Southwell | ............. C09K 8/588 |
| 2003/0220204 | A1 * | 11/2003 | Baran, Jr. | ............. B82Y 30/00 |
| | | | | 507/200 |

(Continued)

FOREIGN PATENT DOCUMENTS

| JP | 2005-526887 A | 9/2005 |
| WO | 2015/116332 A1 | 8/2015 |

(Continued)

OTHER PUBLICATIONS

Nouryon, Levasil CC301 Product Data Sheet, retrieved May 16, 2023 from https://www.nouryon.com/globalassets/inriver/resources/pds-levasil-cc301-en.pdf (Year: 2023).*

(Continued)

*Primary Examiner* — Angela M DiTrani Leff
(74) *Attorney, Agent, or Firm* — Oliff PLC

(57) ABSTRACT

An aqueous sol used in $CO_2$ foam flooding, one of EOR flooding methods for recovering crude oil by injection into the oil reservoir of an onshore or offshore oil field, the aqueous sol increasing foam stability even over a substantial period of time, at high temperatures and pressures, and in salt water, thus improving crude oil recovery rate. The aqueous sol for increasing stability of froth or emulsion in a mixture containing carbon dioxide, water, and oil in $CO_2$ foam flooding of EOR, the sol including silica particles having an average particle diameter of 1 to 100 nm as (Continued)

measured by dynamic light scattering and having surfaces at least partially coated with a silane compound having a hydrolyzable group, the silica particles serving as a dispersoid and dispersed in an aqueous solvent having a pH of 1.0 to 6.0 serving as a dispersion medium.

11 Claims, 18 Drawing Sheets

(56) References Cited

U.S. PATENT DOCUMENTS

| | | | |
|---|---|---|---|
| 2014/0174739 A1* | 6/2014 | Bourcier | E21B 33/13 166/292 |
| 2015/0218435 A1 | 8/2015 | Suresh et al. | |
| 2016/0289539 A1* | 10/2016 | Jangda | C09K 8/584 |
| 2018/0291255 A1 | 10/2018 | Southwell | |
| 2018/0291261 A1* | 10/2018 | Southwell | C09K 8/604 |
| 2019/0078015 A1* | 3/2019 | Southwell | C09K 8/588 |
| 2019/0093462 A1* | 3/2019 | Watts | C09K 8/62 |

FOREIGN PATENT DOCUMENTS

| | | | |
|---|---|---|---|
| WO | WO-2016115142 A1 * | 7/2016 | C09K 8/592 |
| WO | 2018/187563 A1 | 10/2018 | |
| WO | 2018/213050 A1 | 11/2018 | |
| WO | 2019/054414 A1 | 3/2019 | |

OTHER PUBLICATIONS

Aminzadeh et al., SPE 166302, Influence of Surface Treated Nanoparticles on Displacement Patterns During CO2 Injection, Sep. 30-Oct. 2, 2013 (Year: 2013).*
Alzobaidi, S. et al., "Carbon Dioxide-in-Brine Foams at High Temperatures and Extreme Salinities Stabilized with Silica Nanoparticles," Energy Fuels, 2017, vol. 31, pp. 10680-10690.
Rognmo, A.U. et al., "Performance of Silica Nanoparticles in CO2-Foam for EOR and CCUS at Tough Reservoir Conditions," Society of Petroleum Engineers, SPE Norway One Day Seminar, Bergen Norway, Apr. 18, 2018, 12 pp.
Feb. 9, 2021 International Search Report issued in International Patent Application No. PCT/JP2020/044098.
Feb. 9, 2021 Written Opinion of the International Searching Authority issued in International Patent Application No. PCT/JP2020/044098.

* cited by examiner

SALT WATER STABILITY TEST AT LOW SALT CONCENTRATION (35,000 ppm)

1 PRESSURE-RESISTANT CELL FOR VISUAL OBSERVATION
2 STIRRING BAR
3 STIRRER
4 $CO_2$ EXTRUDER
5 $CO_2$ CYLINDER
6 PYREX OBSERVATION WINDOW
7 3-WAY VALVE
8 PC
9 USB CAMERA
10 MICROSCOPE
11 PRESSURE-RESISTANT CELL FOR MICROSCOPIC OBSERVATION
12 PRESSURE GAUGE
13 VALVE

LONG-TERM STABILITY TEST AFTER FOAMING

CONTINUOUS PHASE: DECANE

DISPERSED PHASE: FORMATION OF EMULSION TOGETHER WITH COLORLESS DROPLETS ($CO_2$) AND DARK DROPLETS (WATER CONTAINING SILICA PARTICLES)

CONTINUOUS PHASE: WATER (CONTAINING SILICA PARTICLES)

DISPERSED PHASE: FORMATION OF EMULSION TOGETHER WITH DROPLETS ($CO_2$) AND DROPLETS (DECANE)

(a)            (b)

(a)          (b)

SILICA NANOPARTICLES FOR CRUDE OIL RECOVERY USING CARBON DIOXIDE, AND CRUDE OIL RECOVERY METHOD

TECHNICAL FIELD

The present invention relates to an aqueous sol used in $CO_2$ foam flooding which is one of the enhanced oil recovery (hereinafter referred to as "EOR") flooding methods for recovering crude oil by injection with $CO_2$ into an oil reservoir of onshore or offshore oil field.

BACKGROUND TECHNOLOGY

The recovery (extraction) of crude oil from an oil reservoir is carried out in three-stages; i.e., primary, secondary, and tertiary recovery (or EOR (enhanced recovery)), wherein different recovery methods are used in each of the stages.

The primary recovery method includes flush production, which uses the original pressure and gravity within the oil reservoir, and also artificial lift, which uses an artificial oil extraction technique such as a pumping. The crude oil recovery rate in the primary recovery stage, through combination of these methods is said to be maximum of only about 20%. The secondary recovery method includes water flooding or reservoir pressure maintenance, wherein water or natural gas is injected to maintain reservoir pressure and to increase oil production after production decline in the primary recovery stage. Even with a combination of these primary and secondary recoveries, the crude oil recovery rate is estimated to be about 40%, and the majority of crude oil remains in the subsurface oil reservoir. Thus, the tertiary recovery method; i.e., the enhanced oil recovery method (EOR flooding), has been developed for higher recovery of crude oil, and for recovery of more crude oil from oil reservoirs wherein crude oil has already been recovered from easily recoverable pore spaces.

The EOR technology includes thermal flooding, gas flooding, microbial flooding, and chemical flooding. Among these, gas flooding (also referred to as "miscible gas flooding") forms a miscible state (mixing state under supercritical pressure) between the injection gas (fluid) and oil, to thereby improve the recovery rate of crude oil remaining in micropores of the reservoir rock. In gas flooding, for example, hydrocarbon gas, carbon dioxide ($CO_2$), nitrogen gas, or combustion exhaust gas generated during oil production is utilized for injection, and thus the gas extracted from the oil reservoir can be reused as is, and $CO_2$ in the exhaust gas emitted from, for example, refineries or power plants can be recovered and used. Thus, gas flooding contributes to effective use of available resources while increasing the crude oil recovery rate. In addition, gas flooding has received attention as a technique that can contribute to a reduction in amount of greenhouse gases emitted, i.e., a measure against global warming.

In gas flooding, injection gas tends to diffuse along larger pore spaces in the oil reservoir and is less likely to enter smaller pore spaces, due to high mobility of the injection gas. Thus, the water alternating gas (WAG) injection process, wherein gas and water are injected alternatingly, has also been applied to reduce the high mobility of the injection gas.

$CO_2$ foam flooding, which is intended to improve the recovery efficiency through control of the mobility, has been proposed as a next-generation technology of the aforementioned $CO_2$ gas flooding method. In this flooding method, the viscosity of injection fluid is increased by formation of $CO_2$ foam, and the comparative viscosity of crude oil (i.e., the fluid to be replaced) is made relatively lower, to thereby improve the mobility ratio and to improve the recovery efficiency of crude oil remaining in micropores of the reservoir rock.

For example, regarding $CO_2$ foam flooding, A. U. Rognmo (University of Bergen) et al., "Performance of Silica Nanoparticles in $CO_2$-Foam for EOR and CCUS at Tough Reservoir Conditions", Society of Petroleum Engineers (2018) SPE-191318-MS, Society of Petroleum Engineers, discloses a technique using commercially available silane-modified silica nanoparticles, and Shehab Alzobaidi (University of Texas at Austin) et al., "Carbon Dioxide-in-Brine Foams at High Temperatures and Extreme Salinities Stabilized with Silica Nanoparticles", Energy & Fuels 2017 31 10680-10690, discloses a technique using silica nanoparticles whose surfaces are grafted with ligands. JP 2005-526887 A discloses foam for enhancing oil recovery, the foam containing a foaming composition containing surface-modified silica nanoparticles and a foaming agent (e.g., nitrogen gas). WO 2015/116332 discloses a method for recovering crude oil using emulsion stabilized with amphiphilic nanoparticles containing silica nanoparticles and metal nanoparticles.

SUMMARY OF THE INVENTION

Problems to be Solved by the Invention

In crude oil recovery, a fluid (such as foam) injected into subsurface or undersea oil reservoirs is often produced after the elapse of several months following injection. Thus, a demand has arisen for a fluid which exhibits a crude oil recovery enhancement effect and which is stable for several tens of days to several months even under unusually harsh conditions, such as exposure to high temperatures of 100° C. or thereabouts, high pressures of over 100 atm, and seawater or salt water containing sodium ions, calcium ions, chlorine ions, etc., at high concentrations.

Although various techniques using, for example, silica nanoparticles have been disclosed in $CO_2$ foam flooding of EOR as described above, there have been no reports on, for example, the stability of $CO_2$ foam particularly at high pressure and temperature, or sols containing silica nanoparticles.

The present invention is directed to an aqueous sol used in $CO_2$ foam flooding among EOR flooding methods for recovering crude oil by injection into the oil reservoir of an onshore or offshore oil field. Specifically, an object of the present invention is to provide an aqueous sol that is used for increasing the stability of foam over a long period of time, at high temperatures and pressures, and in salt water, and for improving crude oil recovery rate.

Another object of the present invention is to provide a crude oil recovery method using the aforementioned aqueous sol, and a manufacturing method for the aqueous sol.

Means for Solving the Problems

The present inventors have conducted extensive studies for solving the aforementioned problems, and as a result have found that an aqueous sol wherein silica particles (serving as a dispersoid) having an average particle diameter of 1 to 100 nm and surfaces at least partially coated with a silane compound having a hydrolyzable group are dispersed in an aqueous solvent having a pH of 1.0 or more to 6.0 or less serving as a dispersion medium can increase the stability of foam over a long period of time, at high temperatures and pressures, and in salt water, which leads to an improvement in crude oil recovery rate. The present invention has been accomplished on the basis of this finding.

Accordingly, a first aspect of the present invention is an aqueous sol for increasing the stability of froth or emulsion in a mixture containing carbon dioxide, water, and oil in $CO_2$ foam flooding of enhanced oil recovery (EOR), the aqueous sol comprising:

silica particles having an average particle diameter of 1 to 100 nm as measured by dynamic light scattering and having surfaces at least partially coated with a silane compound having a hydrolyzable group, the silica particles serving as a dispersoid and being dispersed in an aqueous solvent having a pH of 1.0 or more to 6.0 or less serving as a dispersion medium.

A second aspect of the present invention is the aqueous sol according to the first aspect, wherein the silane compound having a hydrolyzable group is a silane compound having an epoxy group or an organic group produced by hydrolysis of the epoxy group.

A third aspect of the present invention is the aqueous sol according to the second aspect, wherein the epoxy group is a glycidyl group, a cyclohexylepoxy group, or a combination of these.

A fourth aspect of the present invention is the aqueous sol according to the first aspect, wherein the silane compound having a hydrolyzable group is a silane compound having an amino group.

A fifth aspect of the present invention is the aqueous sol according to any one of the first to fourth aspects, wherein the silane compound having a hydrolyzable group further contains a second silane compound having a hydrolyzable group.

A sixth aspect of the present invention is the aqueous sol according to the fifth aspect, wherein the second silane compound having a hydrolyzable group is a silane compound having an organic group containing a $C_{1-40}$ alkyl group, a $C_{6-40}$ aromatic ring group, or a combination of these.

A seventh aspect of the present invention is the aqueous sol according to any one of the first to sixth aspects, wherein the mass ratio of the silane compound to the silica particles is 0.01 to 2.00:1.00 in the silica particles having at least partially coated surfaces.

An eighth aspect of the present invention is the aqueous sol according to any one of the first to seventh aspects, wherein the aqueous sol has no isoelectric point at a pH of 6 or less.

A ninth aspect of the present invention is the aqueous sol according to any one of the first to eighth aspects, wherein when the aqueous sol is subjected to a storage test at 80° C. for 30 days in an environment containing sodium chloride, calcium chloride, and magnesium chloride as main components and having a total salt concentration of 10,000 to 230,000 ppm such that the silica concentration is 1.0% by mass, the difference between the average particle diameter as measured by dynamic light scattering after the test and the average particle diameter before the test is 200 nm or less in the aqueous sol.

A tenth aspect of the present invention is the aqueous sol according to any one of the first to ninth aspects, wherein the aqueous sol has a pH of 1.0 or more to 6.0 or less upon coating of the silica particles with the silane compound having a hydrolyzable group in the aqueous medium, and when the aqueous sol stored at a pH of 1.0 or more to 6.0 or less is subjected to a storage test at a pH of 5.0 or more to 8.0 or less at 80° C. for 30 days in an environment containing sodium chloride, calcium chloride, and magnesium chloride as main components and having a total salt concentration of 10,000 to 230,000 ppm such that the silica concentration is 1.0% by mass, the difference between the average particle diameter as measured by dynamic light scattering after the test and the average particle diameter before the test is 200 nm or less in the aqueous sol.

An eleventh aspect of the present invention is the aqueous sol according to any one of the first to tenth aspects, wherein the froth or the emulsion is stable at a temperature of 30 to 120° C. and a pressure of 70 to 400 atm.

A twelfth aspect of the present invention is a crude oil recovery method for recovering crude oil from a subsurface hydrocarbon-containing reservoir, the method comprising:

step (a): a step of injecting the aqueous sol according to any one of the first to eleventh aspects, water and carbon dioxide each alternatingly or simultaneously into a subsurface oil reservoir; and step (b): a step by which oil is recovered to the surface from oil production well drilled into subsurface oil reservoir.

A thirteenth aspect of the present invention is the crude oil recovery method according to the twelfth aspect, wherein the step (a) is a step of injecting the aqueous sol and water, and carbon dioxide alternatingly into the subsurface oil reservoir.

A fourteenth aspect of the present invention is the crude oil recovery method according to the twelfth or thirteenth aspect, wherein the injection in the step (a) is performed at a temperature of 30 to 120° C. and a pressure of 70 to 400 atm.

A fifteenth aspect of the present invention is the crude oil recovery method according to any one of the twelfth to fourteenth aspects, wherein the subsurface oil reservoir contains sandstone.

A sixteenth aspect of the present invention is the crude oil recovery method according to any one of the twelfth to fourteenth aspects, wherein the subsurface oil reservoir contains carbonate rocks.

A seventeenth aspect of the present invention is a manufacturing method for the aqueous sol according to any one of the first to eleventh aspects, the aqueous sol containing, as a dispersoid, silica particles having surfaces at least partially coated with a silane compound having a hydrolyzable group, the manufacturing method comprising a step of mixing an aqueous sol of unmodified colloidal silica with a silane compound having a hydrolyzable group so that the mass ratio of the silane compound to silica particles contained in the aqueous sol is 0.01 to 2:1.00, and treating the mixture at a pH of 1 or more to 6 or less for 0.1 hours to 20 hours.

An eighteenth aspect of the present invention is the manufacturing method according to the seventeenth aspect, wherein the step of mixing the aqueous sol of unmodified colloidal silica with the silane compound having a hydrolyzable group and treating the mixture is performed at 50 to 100° C.

Effects of the Invention

The aqueous sol of the present invention can stably form and maintain fine $CO_2$ foam over a long period of time at high temperatures (30 to 120° C.), high pressures (70 to 400 atm), and different salt concentrations (10,000 to 230,000 ppm).

The formation of $CO_2$ foam exhibiting excellent long-term stability and salt resistance increases the viscosity of the fluid ($CO_2$ foam) to be injected into the subsurface oil reservoir. Thus, it can be expected that the fluid penetrates into pores of the reservoir rock (including pores that have been hitherto difficult to penetrate), thereby improving the recovery efficiency of crude oil in the rock and enabling recovery of crude oil at a higher rate.

MODES FOR CARRYING OUT THE INVENTION

Figure 1:
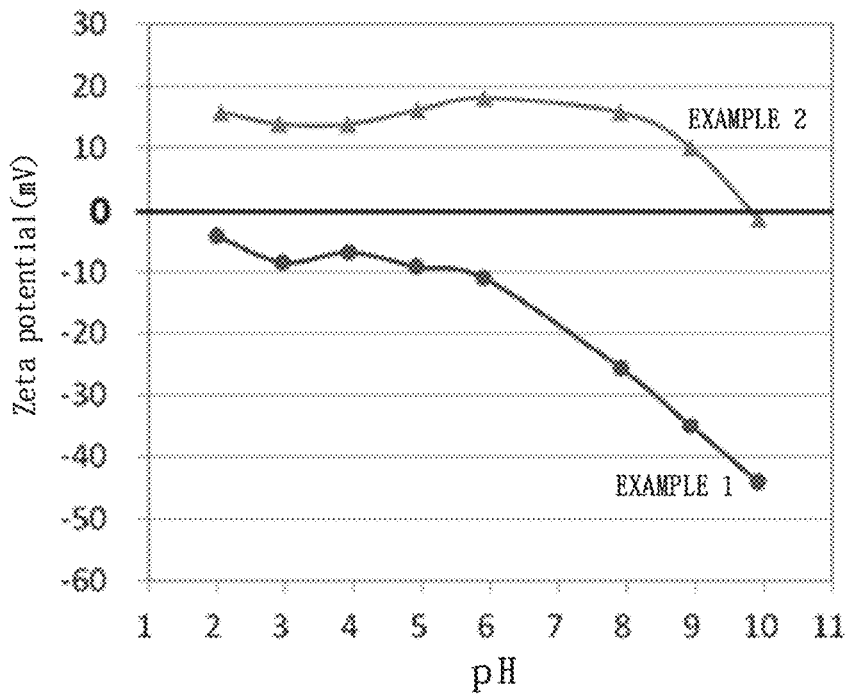
FIG. 1 shows the results of measurement of the zeta potentials of the aqueous sols (aqueous silica sols subjected to surface treatment with a silane compound) prepared in Examples 1 and 2 at different pH values from pH 2 or more to pH 10 or less.

The present invention is directed to an aqueous sol for increasing the stability of froth or emulsion in a fluid in $CO_2$ foam flooding of enhanced oil recovery (EOR). The aqueous sol of the present invention can contribute to formation and stabilization of froth or emulsion through contact of the aqueous sol with water (including salt water, seawater, etc.) and carbon dioxide, and through contact of these with crude oil.

The term "froth" as used herein refers to "foam" composed of numerous bubbles, wherein each bubble has a diameter of about several μm to several hundreds of μm.

In the case of emulsion, each droplet generally has a diameter of about 0.1 μm to several hundreds of μm.

<Aqueous Sol>

In general, an aqueous sol is a colloidal dispersion system containing an aqueous solvent serving as a dispersing medium and colloidal particles serving as a dispersoid. The present invention is particularly directed to an aqueous sol wherein the dispersing medium is an aqueous medium (water) having an acidic pH, and the dispersoid is silica particles subjected to surface treatment with a specific functional group. Specifically, the present invention is directed to an aqueous sol wherein the dispersoid is silica particles having surfaces at least partially coated with a silane compound having a hydrolyzable group (hereinafter may be simply referred to as "silane compound") (hereinafter the silica particles may be referred to as "silica particles subjected to surface treatment with a silane compound" or "surface-treated silica particles"), and the dispersion medium is an aqueous solvent having a pH of 1.0 or more to 6.0 or less.

The phrase "silica particles having surfaces at least partially coated with a silane compound having a hydrolyzable group" as used herein refers to a state where the silane compound having a hydrolyzable group is bonded to at least a portion of the surfaces of silica particles"; specifically includes a state where the silane compound covers the entire surfaces of silica particles, a state where the silane compound covers a portion of the surfaces of silica particles, and a state where the silane compound is bonded to the surfaces of silica particles.

The silica particles (surface-treated silica particles) contained in the aqueous sol of the present invention can be evaluated for their average particle diameter (DLS average particle diameter) and dispersion state by dynamic light scattering.

The DLS average particle diameter corresponds to the average of the diameters of secondary particles (diameters of dispersed particles). It is said that the DLS average particle diameter of completely dispersed particles is about twice the average primary particle diameter (i.e., specific surface area diameter as measured by the nitrogen gas adsorption method (BET method) or the Sears method, corresponding to the average of primary particle diameters). Thus, the measurement of the DLS average particle diameter can determine whether the colloidal particles (surface-treated silica particles in the present invention) contained in the aqueous sol are in a dispersed state or in an aggregated state. Specifically, it can be determined that a larger DLS average particle diameter indicates an aggregated state of the colloidal particles contained in the aqueous sol.

In the present invention, the surface-treated silica particles contained in the aqueous sol may have an average particle diameter (DLS particle diameter) of 1 to 100 nm, or 1 to 50 nm, or 3 to 30 nm, or 5 to 15 nm. The particles having a DLS average particle diameter of more than 1 nm do not aggregate in the aqueous sol and remain stable therein, whereas the particles having a DLS average particle diameter of less than 100 nm enable the sol to readily penetrate into pores of sandstone or carbonate rocks present in the subsurface oil field reservoir, resulting in improved crude oil recovery rate.

In the surface-treated silica particles contained in the aqueous sol, the mass ratio of the silane compound to the silica particles is, for example, 0.01 to 2.00:1.00, or 0.30 to 2.00:1.00, or 0.33 to 2.00:1.00, or 0.33 to 1.00:1.00.

When the amount of the silane compound is 0.01 parts by mass or more (preferably 0.30 parts by mass or more) relative to 1.00 parts by mass of the silica particles contained in the aqueous sol, the aqueous sol can be expected to have favorable salt resistance. However, when the amount of the silane compound is adjusted to 2.00 parts by mass or more, an effect commensurate with an increase in the amount cannot be obtained.

In the aforementioned aqueous sol, the concentration of the surface-treated silica particles (solid content concentration) may be, for example, 1 to 40% by mass.

Preferably, the aqueous sol of the present invention has no isoelectric point at a pH of 6 or less, for example, a pH range of 1 or more to 6 or less. In such a case, the aqueous sol can be expected not to aggregate but to remain stable.

In general, the salt concentration of seawater is about 30,000 ppm to 40,000 ppm, the salt concentration of oil and gas fields in Japan is about 10,000 ppm to 50,000 ppm, and the salt concentration of formation water overseas (for example, in the Abu Dhabi carbonate rock oil field) is about 160,000 ppm, etc. In view of injection of the aqueous sol of the present invention into an oil reservoir in an onshore or offshore oil field, the aqueous sol desirably exhibits high salt resistance in an environment having a salt concentration of about 10,000 ppm (corresponding to 1.0% by mass) to over 200,000 ppm; specifically, it is desirable that the silica particles contained in the aqueous sol do not aggregate or gelate and remain in a dispersed state in the aforementioned environment.

In the present invention, the salt resistance (salt water stability) of the aqueous sol can be evaluated by a salt resistance test wherein the aqueous sol is stored at a pH of 5.0 or more to 8.0 or less and 80° C. for 30 days in an environment containing sodium chloride, calcium chloride, and magnesium chloride as main components and having a total salt concentration of 10,000 to 230,000 ppm such that the silica concentration is 1.0% by mass. When a change in the average particle diameter of the aqueous sol as measured by dynamic light scattering is small before and after this test, the silica particles contained in the aqueous sol can be evaluated to maintain their dispersed state. However, when the aqueous sol exhibits poor salt resistance, the DLS average particle diameter becomes very large after the salt resistance test, which reflects the aggregated state of the silica particles contained in the sol.

In the present invention, the aqueous sol can be determined to have good salt resistance when the average particle diameter measured by dynamic light scattering after the aforementioned salt resistance test differs by 200 nm or less from the average particle diameter before the test. In particular, when the difference in DLS average particle diameter between before and after the test is 200 nm or less (e.g., 160 nm or less), the aqueous sol can be determined to have very good salt resistance without alteration (aggregation or gelation) of the silica sol.

The silica particles contained in the aqueous sol of the present invention can maintain stable froth or emulsion form in the presence of water, oil, and carbon dioxide at a temperature of 30 to 120° C. and a pressure of 70 to 400 atm. The term "stable" as used herein refers to the case where the froth or the emulsion does not disintegrate or separate. The present inventors confirmed that when froth or emulsion is formed for several hours under static conditions, the foam or the emulsion stably maintains its form for several days.

Carbon dioxide becomes supercritical under conditions of 31.1° C. and 72.8 atm or higher. In the present invention, the oil in rock pores is displaced by water (containing the silica particles), oil, and carbon dioxide in the form of froth or emulsion. In this case, the carbon dioxide may be in a homogeneous supercritical state or in a gas or liquid phase state.

The aforementioned aqueous sol is prepared by mixing a silane compound having a hydrolyzable group with an (unmodified) aqueous silica sol, and then subjecting the mixture to thermal treatment as described below. The aqueous silica sol and the silane compound having a hydrolyzable group, which form the aqueous sol, will be described below in detail.

<Aqueous Silica Sol>

The aqueous silica sol (unmodified silica sol), which forms the aqueous sol of the present invention, is an aqueous silica sol containing colloidal silica as a dispersoid, and can be produced by any known method using water glass (aqueous sodium silicate solution) as a raw material.

The average particle diameter of the aqueous silica sol indicates the average particle diameter of the colloidal silica particles serving as a dispersoid. Unless otherwise specified, the average particle diameter refers to the specific surface area diameter as measured by the nitrogen gas adsorption method (BET method) or the particle diameter as measured by the Sears method.

The specific surface area diameter (average particle diameter (specific surface area diameter) D (nm)) as measured by the nitrogen gas adsorption method (BET method) is given by the following formula: D (nm)=2720/S wherein S represents the specific surface area ($m^2/g$) as measured by the nitrogen gas adsorption method.

The particle diameter as measured by the Sears method corresponds to the average particle diameter measured according to the literature: G. W. Sears, Anal. Chem. 28 (12), p. 1981, 1956 (Rapid Method for Determination of Colloidal Silica Particle Diameter). Specifically, the particle diameter corresponds to the equivalent diameter (specific surface area diameter) calculated from the specific surface area of colloidal silica determined from the amount of 0.1N—NaOH required for titration, from pH 4 or more to pH 9 or less, of colloidal silica equivalent to 1.5 g of $SiO_2$.

In the present invention, the average particle diameter of the aqueous silica sol (colloidal silica particles) as measured by the nitrogen gas adsorption method (BET method) or the Sears method may be, for example, 1 to 100 nm, or 1 to 50 nm, or 3 to 30 nm, or 5 to 15 nm.

The aforementioned aqueous silica sol may be a commercially available product. An aqueous silica sol having a silica concentration of 5 to 50% by mass is generally commercially available. Such a product is preferred since it is readily available.

The aqueous silica sol may be an alkaline aqueous silica sol or an acidic aqueous silica sol. However, an acidic aqueous silica sol having a pH of 1.0 or more to 6.0 or less is preferably used, since such an aqueous silica sol enables production of an aqueous sol exhibiting excellent salt resistance (no aggregation).

Examples of the commercially available acidic aqueous silica sol include Snowtex (registered trademark) ST-OXS, ST-OS, and ST-O (available from Nissan Chemical Corporation).

The aqueous silica sol used for the aqueous sol may have a silica ($SiO_2$) concentration of, for example, 1 to 40% by mass.

<Silane Compound>

The silane compound used for the surface treatment of the aforementioned aqueous silica sol is a silane compound having a hydrolyzable group. Examples of the hydrolyzable group include an alkoxy group, an acyloxy group, and a halogen group.

In particular, the hydrolyzable group is preferably an alkoxy group such as methoxy group or ethoxy group. For example, a silane compound having a methoxy group as a hydrolyzable group is preferably used.

The aforementioned silane compound having a hydrolyzable group may be a silane compound having, besides the hydrolyzable group, an epoxy group or an organic group produced by hydrolysis of the epoxy group. The epoxy group may be a glycidyl group, a cyclohexylepoxy group, or a combination of these. As described below, the aforementioned silane compound having a hydrolyzable group may be a silane compound having, besides the hydrolyzable group, an oxetane ring instead of an epoxy group.

Examples of the silane compound having the epoxy group (and a hydrolyzable group) include 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(3,4-epoxycyclohexyl)propyltrimethoxysilane, 3-(3,4-epoxycyclohexyl)propyltriethoxysilane, 2-(3,4-epoxycyclohexyl)ethyltrimethoxysilane, 2-(3,4-epoxycyclohexyl)ethyltriethoxysilane, 1-(3,4-epoxycyclohexyl)methyltrimethoxysilane, and 1-(3,4-epoxycyclohexyl)methyltriethoxysilane. These silane compounds may be used alone or in combination of two or more species.

As described above, the silane compound having an epoxy group may be replaced by a silane compound having an oxetane ring. Examples of the silane compound having an oxetane ring include [(3-ethyl-3-oxetanyl)methoxy]propyltrimethoxysilane and [(3-ethyl-3-oxetanyl)methoxy]propyltriethoxysilane.

The aforementioned silane compound having a hydrolyzable group may be a silane compound having an amino group besides the hydrolyzable group.

Examples of the silane compound having an amino group (and a hydrolyzable group) include N-2-(aminoethyl)-3-aminopropylmethyldimethoxysilane, N-2-(aminoethyl)-3-aminopropyltrichlorosilane, 3-aminopropyltrimethoxysilane, 3-aminopropyltrimethoxysilane, 3-aminopropyltriethoxysilane, 3-aminopropylmethyldimethoxysilane, 3-aminopropylmethyldiethoxysilane, 3-triethoxysilyl-N-(1,3-dimethyl-butylidene)propylamine, N-phenyl-3-aminopropyltrimethoxysilane, and N-phenyl-3-aminopropyltriethoxysilane. These silane compounds may be used alone or in combination of two or more species.

In the present invention, the silane compound used for the surface treatment of the aforementioned aqueous silica sol may further contain a second silane compound having a hydrolyzable group besides the aforementioned silane compound having a hydrolyzable group (i.e., the silane compound having an epoxy group or an organic group produced by hydrolysis of the epoxy group, or the silane compound having an amino group).

The second silane compound having a hydrolyzable group may be a silane compound having an organic group containing a $C_{1-40}$ alkyl group, a $C_{6-40}$ aromatic ring group, or a combination of these.

Examples of the silane having the aforementioned hydrolyzable group and having a $C_{1-40}$ alkyl group include alkoxysilanes, such as methyltrimethoxysilane, methyltriethoxysilane, dimethyldimethoxysilane, dimethyldiethoxysilane, trimethylmethoxysilane, ethyltrimethoxysilane, ethyltriethoxysilane, n-propyltrimethoxysilane, n-propyltriethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane. These silane compounds may be used alone or in combination of two or more species.

Examples of the silane having the aforementioned hydrolyzable group and having a $C_{6-40}$ aromatic ring group include phenyltrimethoxysilane, phenyltriethoxysilane, diphenyldimethoxysilane, and diphenyldiethoxysilane.

The use of the second silane compound having a hydrolyzable groups in combination can be expected to further enhance the effect of stabilizing froth or emulsion in the liquid in $CO_2$ foam flooding.

The second silane compound having a hydrolyzable group is preferably used in combination particularly with a silane compound having a hydrolyzable group containing an amino group.

In the present invention, the surfaces of silica particles are treated (modified) by using, as an essential material, the silane compound having a hydrolyzable group and having an epoxy group or an organic group produced by hydrolysis of the epoxy group or the silane compound having an amino group (the first silane compound), and by using, if desired, the silane compound having a hydrolyzable group and having an organic group containing a $C_{1-40}$ alkyl group, a $C_{6-40}$ aromatic ring group, or a combination of these (the second silane compound). The ratio by mole of the first silane compound to the second silane compound in the entire silane compound may be 1.00:0 to 3.00 or 1.00:0 to 1.00.

In particular, the silane compound used for the surface treatment of the aforementioned aqueous silica sol may be, for example, 3-glycidoxypropyltrimethoxysilane, 3-glycidoxypropyltriethoxysilane, a combination of 3-glycidoxypropyltrimethoxysilane with 2-(3,4-epoxycyclohexyl)ethyltrimethoxysilane, or a combination of 3-aminopropyltriethoxysilane with phenyltrimethoxysilane.

The aforementioned silane compound may be a commercially available product. Examples of the commercially available product include trade name KBM-403 (3-glycidoxypropyltrimethoxysilane), KBE-403 (3-glycidoxypropyltriethoxysilane), KBM-303 (2-(3,4-epoxycyclohexyl)ethyltrimethoxysilane), KBE-903 (3-aminopropyltriethoxysilane), and KBM-103 (phenyltrimethoxysilane), which are available from Shin-Etsu Chemical Co., Ltd.

The present invention involves the use of silane particles having surfaces bonded with a silane having an organic functional group, which are prepared by treating (coating) the surfaces of silica particles contained in an aqueous silica sol with a silane having a hydrolyzable group. In the present invention, an important factor in salt resistance is a combination of the pH of an aqueous silica sol as a raw material and the aforementioned hydrolyzable group. When an acidic aqueous silica sol is used as a raw material, the hydrolyzable group of the aforementioned silane may be a methoxy group or an ethoxy group, each of which provides favorable effects.

When an alkaline aqueous silica sol is used as a raw material, gelation is likely to proceed during production of the aqueous sol if the hydrolyzable group of the aforementioned silane is a methoxy group, or salt water resistance is lowered if the hydrolyzable group is an ethoxy group. When an alkaline aqueous silica sol is used and coated with a silane having an ethoxy group as a hydrolyzable group, salt water resistance is lowered even if the pH is then made acidic.

<Surface Treatment Method (Manufacturing Method for Aqueous Sol)>

The silica particles subjected to surface treatment with a silane compound can be prepared by adding the aforementioned silane compound having a hydrolyzable group to the aforementioned aqueous silica sol (preferably, an acidic aqueous silica sol having a pH of 1.0 or more to 6.0 or less), and then subjecting the mixture to thermal treatment at, for example, 50 to 100° C. for one hour to 20 hours. In this case, the silane compound having a hydrolyzable group may be added to the aqueous silica sol so that the mass ratio of the silane compound to the silica particles (silica solid content) in the aqueous silica sol is as follows: for example, the mass ratio of the silane compound to the silica particles of 0.01 to 2.00:1.00, or 0.30 to 2.00:1.00, or 0.33 to 2.00:1.00, or 0.33 to 1.00:1.00.

When the thermal treatment temperature is lower than 50° C., the rate of partial hydrolysis of the hydrolyzable group is reduced, and thus the surface treatment efficiency is lowered, whereas when the thermal treatment temperature is higher than 100° C., dry silica gel is generated, which is not desirable.

When the thermal treatment time is less than one hour, the hydrolysis reaction of the silane compound having a hydrolyzable group proceeds insufficiently. Meanwhile, even when the thermal treatment time is longer than 20 hours, the hydrolysis reaction of the silane compound becomes almost saturated, and thus the heating time need not be longer. The phrase "silica particles coated with a silane compound" encompasses the case where hydrolyzable groups are completely hydrolyzed, and the silica particles are coated with siloxane bonds, and the case where some hydrolyzable groups remain unreacted and the other hydrolyzable groups are hydrolyzed, and the silica particles are with siloxane bonds.

The amount of surface treatment (coating) with the silane compound having a hydrolyzable group; i.e., the number of silane compound molecules bonded to the silica particle surface is preferably, for example, 0.01 to 5 or 1 to 5 per $nm^2$ of the silica particle surface.

The resultant aqueous sol containing, as a dispersoid, silica particles subjected to surface treatment with the silane compound corresponds to an aqueous sol dispersed in an aqueous solvent having a pH of 1.0 or more to 6.0 or less; i.e., an aqueous sol stored at a pH of 1.0 or more to 6.0 or less.

Surface-treated silica particles may be prepared by using an alkaline aqueous silica sol (pH 8 or higher), and adding a silane compound having a hydrolyzable group to the aqueous silica sol in the same manner as described above. However, an aqueous sol containing surface-treated silica particles dispersed in an aqueous medium prepared by using an alkaline aqueous silica sol as a raw material requires attention, since the average particle diameter as measured by dynamic light scattering increases significantly after the salt resistance test described above; i.e., the silica particles are likely to aggregate and to be less stable. When surface-treated silica particles are prepared under alkaline conditions, the aqueous sol wherein the particles are dispersed is confirmed to exhibit poor foamability in a mixture system of water, carbon dioxide, and a crude oil substitute (hydrocarbon (decane)). Thus, the aqueous sol is less likely to be effective in crude oil recovery by carbon dioxide foam.

When an aqueous silica sol (aqueous sol) containing surface-treated silica particles prepared under alkaline conditions is made acidic with, for example, hydrochloric acid (e.g., pH 1.0 or more to 6.0 or less) to thereby yield an acidic aqueous silica sol (aqueous sol), the average particle diameter as measured by dynamic light scattering increases after the aforementioned salt resistance test, and the silica particles aggregate and exhibit lowered stability. This acidic aqueous silica sol also exhibits poor foamability in a mixture system of water, carbon dioxide, and a crude oil substitute (decane). Rock pores that contribute to fluid flow are considered to have a diameter of several μm or more. Thus, conceivably, the aggregated and gelated aqueous silica sol is difficult to pass through rock pores of several μm sufficiently in the core flood test. Therefore, the aforementioned alkaline aqueous silica sol (aqueous sol) subjected to surface treatment with a silane compound under alkaline conditions, or the acidic aqueous silica sol (aqueous sol) prepared from the alkaline aqueous silica sol is not suitable for crude oil recovery in the present invention.

<Crude Oil Recovery Method>

The aqueous sol of the present invention can be used to recover crude oil from a subsurface hydrocarbon-containing reservoir through, for example, a procedure including step (a): a step of injecting the aqueous sol of the present invention, water, and carbon dioxide alternatingly or simultaneously into the subsurface oil reservoir, and step (b): a step by which oil is recovered to the surface from oil production well drilled into subsurface oil reservoir.

The water to be injected in the step (a) may be salt water containing chlorine ions and sodium ions, calcium ions, magnesium ions, etc., or may be seawater (for example, when the aqueous sol is assumed to be used in oil reservoirs in offshore oil fields). No particular limitation is imposed on the salt concentration of such salt water or seawater, but the salt concentration is generally about 10,000 to 230,000 ppm as described above.

Upon injection, the mass ratio of the surface-treated silica particles contained in the aqueous sol to water (or salt water, seawater) may be, for example, about 1:3 to 1,000, and the ratio by volume of water (or salt water, seawater) to carbon dioxide may be, for example, about 1:0.01 to 100.

Preferably, the injection pressure is equal to or higher than the natural injection pressure by the gravity of a fluid from an injection well, and equal to or lower than the initial pressure of the target reservoir or the stratum failure pressure of cap rock, whichever is higher.

The injection step can be performed, for example, at a temperature of 30 to 120° C. and a pressure of 70 to 400 atm.

The step (a) may be, for example, a step of injecting the aqueous sol and water, and carbon dioxide alternatingly into the subsurface oil reservoir. The carbon dioxide to be injected may be supercritical carbon dioxide or liquid carbon dioxide.

In the step (a), the aqueous sol or water may contain an optional component used for crude oil recovery. Examples of the optional component include, but are not limited to, a surfactant, a thickener, an oxygen scavenger, a corrosion inhibitor, an algaecide, a biocide, and a scale inhibitor.

No particular limitation is imposed on the subsurface oil reservoir targeted by the crude oil recovery method, and the target reservoir may be, for example, a reservoir containing sandstone or a reservoir containing carbonate rocks.

In the present invention, the aqueous sol, water, and carbon dioxide are injected into the formation rock so that the zeta potentials of the silica particles in the aqueous sol and the formation rock are negative or positive each other. This can prevent aggregation of the silica particles in rock pores, which is preferable for the formation and maintenance of stable $CO_2$ foam and an improvement in crude oil recovery efficiency on the basis thereof.

In the present invention, liquid carbon dioxide injected into the subsurface oil reservoir forms $CO_2$ foam therein. This probably leads to an increase in the viscosity of the mixture containing the aqueous sol, water, and carbon dioxide, and enhances the recovery of oil in rock pores by the fluid having increased viscosity. The viscosity of the fluid formed of the mixture is preferably, for example, 1 cP to 100 cP, or 1 cP to 50 cP.

The step (a) is followed by the step (b): a step by which oil is recovered to the surface from oil production well drilled into subsurface oil reservoir.

EXAMPLES (The following apparatuses were used for analysis in Examples and Comparative Examples.)

pH: Measured with a pH meter (available from DKK-TOA CORPORATION).

Viscosity: Measured with Ostwald viscometer (available from AS ONE CORPORATION).

Average primary particle diameter as measured by the nitrogen gas adsorption method (BET method): An aqueous silica sol was dried and the resultant silica solid was pulverized, and then the pulverized product was further dried to yield silica powder. The average primary particle diameter was calculated on the basis of the specific surface area of the silica powder determined with a specific surface area measuring device Monosorb (available from Quantachrome Instruments).

Average particle diameter as measured by dynamic light scattering (DLS average particle diameter): Measured with a dynamic light scattering particle diameter analyzer Zetasizer Nano (available from Malvern Panalytical, Spectris Co., Ltd.) after dilution of an aqueous sol.

Zeta potential: An aqueous sol was diluted, and then 0.4 M sulfuric acid was added thereto, to thereby adjust the pH of the mixture to 2. Thereafter, while 0.25 M aqueous NaOH solution was added to the mixture for increasing the pH of the mixture, the zeta potential was measured at different pH values with a zeta potential/particle diameter/molecular weight measuring system ELSZ-2000ZS (available from Otsuka Electronics Co., Ltd.).

Preparation of rock core sample: A rock core sample was pulverized, and the compositional data of the rock core sample (in terms of metal oxide) were obtained with a wavelength dispersion-type fluorescent X-ray analyzer Supermini 200 (available from Rigaku Corporation).

Observation of profile of rock core sample: The surface profile of a rock core sample was observed with a scanning electron microscope JSM-6010LV (available from JEOL Ltd.).

(Salt Composition of Salt Water Used for Evaluation)

Table 1 shows the salt compositions of domestic oil field formation water (salt concentration: 14,000 ppm), salt water of low salt concentration (salt concentration: 35,000 ppm), salt water of medium salt concentration (salt concentration: 175,000 ppm), and salt water of high salt concentration (salt concentration: 229,000 ppm) used for evaluation.

TABLE 1

Salt Compositions of Salt Waters used for Evaluation

| | Domestic oil field formation water (14,000 ppm) composition (ppm) | Salt water of low salt concentration (35,000 ppm) composition (ppm) | Salt water of medium salt concentration (175,000 ppm) composition (ppm) | Salt water of high salt concentration (229,000 ppm) composition (ppm) |
|---|---|---|---|---|
| NaCl | 12000 | 24800 | 102500 | 130000 |
| $CaCl_2$ | 200 | 1100 | 60000 | 82500 |
| $MgCl_2$ | 100 | 5300 | 11400 | 16700 |
| $Na_2SO_4$ | 200 | 4100 | 400 | 100 |
| $H_3BO_3$ | 1000 | — | — | — |

Example 1: Production of Aqueous Sol Containing Silica Particles Subjected to Surface Treatment with 3-Glycidoxypropyltrimethoxysilane (GPS)

A 500 mL glass-made eggplant-shaped flask was charged with 300 g of an aqueous silica sol (Snowtex (registered trademark) ST-OXS, available from Nissan Chemical Corporation, silica concentration: 10.5% by mass, average primary particle diameter: 5 nm, pH 3.0) and a stirring bar. Thereafter, while the aqueous silica sol was stirred with a magnetic stirrer, 13.5 g of 3-glycidoxypropyltrimethoxysilane (GPS) (trade name KBM-403, available from Shin-Etsu Chemical Co., Ltd.) was added to the flask so that the mass ratio of the silane compound was 0.43 parts relative to 1.00 part of silica particles contained in the aqueous silica sol. Subsequently, a cooling tube through which tap water flowed was provided on the top of the eggplant-shaped flask, and the aqueous silica sol was heated to 80° C. and maintained under reflux at 80° C. for eight hours. After being cooled to room temperature, the aqueous silica sol was removed from the flask, to thereby yield 313.5 g of an aqueous silica sol subjected to surface treatment with the silane compound (GPS) (hereinafter referred to as "aqueous sol of Example 1," mass ratio of the silane compound relative to 1.00 part of the silica particles: 0.43 parts, silica concentration: 11.0% by mass, pH 3.1, viscosity: 1.8 cP, specific gravity: 1.06, DLS average particle diameter: 8.0 nm).

Example 2: Production of Aqueous Sol Containing Silica Particles Subjected to Surface Treatment with 3-Aminopropyltriethoxysilane (APTES) and Phenyltrimethoxysilane (PTMS)

A 500 mL glass-made eggplant-shaped flask was charged with 300 g of an aqueous silica sol (Snowtex (registered trademark) ST-OXS, available from Nissan Chemical Corporation, silica concentration: 10.5% by mass, average primary particle diameter: 5 nm, pH 3.0) and a stirring bar. Thereafter, while the aqueous silica sol was stirred with a magnetic stirrer, 6.9 g of 85% DL-lactic acid (available from Sigma-Aldrich). Subsequently, 9.5 g of 3-aminopropyltriethoxysilane (APTES) (trade name KBE-903, available from Shin-Etsu Chemical Co., Ltd.) was added to the flask so that the mass ratio of the silane compound was 0.30 parts relative to 1.00 part of silica particles contained in the aqueous silica sol, and the container was sealed and maintained in an oven at 60° C. for 12 hours. Subsequently, while the aqueous silica sol was stirred with the magnetic stirrer, 1.7 g of phenyltrimethoxysilane (PTMS) (trade name KBM-103, available from Shin-Etsu Chemical Co., Ltd.) was added to the flask so that the mass ratio of the silane compound was 0.05 parts relative to 1.00 part of the silica particles contained in the aqueous silica sol. A cooling tube through which tap water flowed was provided on the top of the eggplant-shaped flask, and the aqueous silica sol was heated to 60° C. and maintained under reflux at 60° C. for three hours. After being cooled to room temperature, the aqueous silica sol was removed from the flask, to thereby yield 318.1 g of an aqueous silica sol subjected to surface treatment with the silane compounds (APTES+PTMS) (hereinafter referred to as "aqueous sol of Example 2," mass ratio of the entire silane compound relative to 1.00 part of the silica particles: 0.35 parts, silica concentration: 10.8% by mass, pH 4.0, viscosity: 1.8 cP, specific gravity: 1.06, DLS average particle diameter: 13.0 nm).

Example 3: Production of Aqueous Sol Containing Silica Particles Subjected to Surface Treatment with 3-Glycidoxypropyltrimethoxysilane (GPS) and 2-(3,4-Epoxycyclohexyl)ethyltrimethoxysilane (EPCHS)

A 500 mL glass-made eggplant-shaped flask was charged with 300 g of an aqueous silica sol (Snowtex (registered trademark) ST-OXS, available from Nissan Chemical Corporation, silica concentration: 10.5% by mass, average primary particle diameter: 5 nm, pH 3.0) and a stirring bar. Thereafter, while the aqueous silica sol was stirred with a magnetic stirrer, 13.5 g of 3-glycidoxypropyltrimethoxysilane (GPS) (trade name KBM-403, available from Shin-Etsu Chemical Co., Ltd.) was added to the flask so that the mass ratio of the silane compound was 0.43 parts relative to 1.00 part of silica particles contained in the aqueous silica sol. Subsequently, a cooling tube through which tap water flowed was provided on the top of the eggplant-shaped flask, and the aqueous silica sol was heated to 80° C. and maintained under reflux at 80° C. for eight hours. After cooling of the aqueous silica sol to room temperature, while the aqueous silica sol was stirred with the magnetic stirrer, 7.0 g of 2-(3,4-epoxycyclohexyl)ethyltrimethoxysilane (EPCHS) (trade name KBM-303, available from Shin-Etsu Chemical Co., Ltd.) was added to the flask so that the mass ratio of the silane compound was 0.22 parts relative to 1.00 part of the silica particles contained in the aqueous silica sol. Subsequently, a cooling tube through which tap water flowed was provided on the top of the eggplant-shaped flask, and the aqueous silica sol was heated to 60° C. and maintained under reflux at 60° C. for three hours. After being cooled to room temperature, the aqueous silica sol was removed from the flask, to thereby yield 320.5 g of an aqueous silica sol subjected to surface treatment with the silane compounds (GPS+EPCHS) (hereinafter referred to as "aqueous sol of Example 3," mass ratio of the entire silane compound relative to 1.00 part of the silica particles: 0.65 parts, silica concentration: 11.4% by mass, pH 3.1, viscosity: 2.2 cP, specific gravity: 1.06, DLS average particle diameter: 8.9 nm).

Example 4: Production of Aqueous Sol Containing Silica Particles Subjected to Surface Treatment with 3-Glycidoxypropyltrimethoxysilane (GPS) and 2-(3,4-Epoxycyclohexyl)ethyltrimethoxysilane (EPCHS)

A 500 mL glass-made eggplant-shaped flask was charged with 300 g of an aqueous silica sol (Snowtex (registered trademark) ST-OS, available from Nissan Chemical Corporation, silica concentration: 20.5% by mass, average primary particle diameter: 9 nm, pH 3.0) and a stirring bar. Thereafter, while the aqueous silica sol was stirred with a magnetic stirrer, 14.6 g of 3-glycidoxypropyltrimethoxysilane (GPS) (trade name KBM-403, available from Shin-Etsu Chemical Co., Ltd.) was added to the flask so that the mass ratio of the silane compound was 0.24 parts relative to 1.00 part of silica particles contained in the aqueous silica sol. Subsequently, a cooling tube through which tap water flowed was provided on the top of the eggplant-shaped flask, and the aqueous silica sol was heated to 80° C. and maintained under reflux at 80° C. for eight hours. After cooling of the aqueous silica sol to room temperature, while the aqueous silica sol was stirred with the magnetic stirrer, 15.2 g of 2-(3,4-epoxycyclohexyl)ethyltrimethoxysilane (EPCHS) (trade name KBM-303, available from Shin-Etsu Chemical Co., Ltd.) was added to the flask so that the mass ratio of the silane compound was 0.25 parts relative to 1.00 part of the silica particles contained in the aqueous silica sol. Subsequently, a cooling tube through which tap water flowed was provided on the top of the eggplant-shaped flask, and the aqueous silica sol was heated to 60° C. and maintained under reflux at 60° C. for three hours. After being cooled to room temperature, the aqueous silica sol was removed from the flask, to thereby yield 329.8 g of an aqueous silica sol subjected to surface treatment with the silane compounds (GPS+EPCHS) (hereinafter referred to as "aqueous sol of Example 4," mass ratio of the entire silane compound relative to 1.00 part of the silica particles: 0.49 parts, silica concentration: 20.8% by mass, pH 2.9, viscosity: 3.3 cP, specific gravity: 1.13, DLS average particle diameter: 18.2 nm).

Comparative Example 1: Production of Aqueous Sol Containing Silica Particles Subjected to Surface Treatment with 3-Glycidoxypropyltriethoxysilane (GPTES)

Water was added to commercially available sodium water glass (JIS No. 3 sodium water glass, SiO$_2$ concentration: 28.8% by mass, Na$_2$O concentration: 9.5% by mass) to thereby prepare an aqueous sodium silicate solution having a silica concentration of 3.8% by mass. The aqueous sodium silicate solution was caused to pass through a column charged with a hydrogen type strongly acidic cation exchange resin (Amberlite IR-120B, available from The Dow Chemical Company), to thereby prepare a colloidal aqueous solution of active silica (silica concentration: 3.6% by mass, pH 3.2).

A reaction device including a glass-made reaction container (inner volume: 3 L) equipped with a stirrer, a heater, etc. was charged with 11.9 g of 10% aqueous sodium hydroxide solution and 291.7 g of pure water, and the mixture was heated to 55° C. Thereafter, while the mixture was maintained at 55° C., 732.0 g of the colloidal aqueous solution of active silica was continuously added to the mixture over two hours. Subsequently, while the temperature of the mixture was increased to 80° C., 1,464.4 g of the colloidal aqueous solution of active silica was continuously added to the mixture over four hours. The resultant mixture was then maintained at 80° C. for six hours to thereby yield 2,500.0 g of a dilute alkaline silica sol (silica concentration: 3.1% by mass, pH 9.7, average primary particle diameter: 7 nm). Subsequently, the dilute alkaline silica sol was concentrated with an ultrafiltration device to thereby prepare an alkaline aqueous silica sol (silica concentration: 28% by mass, average primary particle diameter: 7 nm, pH 9.0, viscosity: 5 cP, specific gravity: 1.2, DLS average particle diameter: 9.4 nm).

A 500 mL glass-made eggplant-shaped flask was charged with 250 g of the alkaline aqueous silica sol and a stirring bar. Thereafter, while the aqueous silica sol was stirred with a magnetic stirrer, an aqueous HCl solution was added to adjust the pH to 8, and 18.9 g of 3-glycidoxypropyltriethoxysilane (GPTES) (trade name KBE-403, available from Shin-Etsu Chemical Co., Ltd.) was added to the flask so that the mass ratio of the silane compound was 0.27 parts relative to 1.00 part of silica particles contained in the aqueous silica sol. Thereafter, the resultant mixture was maintained at 23° C. for two hours. The aqueous silica sol was removed from the flask, to thereby yield 269.0 g of an aqueous silica sol subjected to surface treatment with the silane compound (GPTES) (hereinafter referred to as "aqueous sol of Comparative Example 1," mass ratio of the silane compound relative to 1.00 part of the silica particles: 0.27 parts, silica solid content: 28% by mass, average primary particle diameter: 7 nm, pH 8, viscosity: 5 cP, specific gravity: 1.2, DLS average particle diameter: 19.0 nm).

Comparative Example 2: Production of Aqueous Sol Containing Silica Particles Subjected to Surface Treatment with 3-Glycidoxypropyltrimethoxysilane (GPS)

A 500 mL glass-made eggplant-shaped flask was charged with 300 g of an aqueous silica sol (Snowtex (registered trademark) ST-XS, available from Nissan Chemical Corporation, silica concentration: 20.5% by mass, average primary particle diameter: 5 nm, pH 9.5) and a stirring bar. Thereafter, while the aqueous silica sol was stirred with a magnetic stirrer, 26.3 g of 3-glycidoxypropyltrimethoxysilane (GPS) (trade name KBM-403, available from Shin-Etsu Chemical Co., Ltd.) was added to the flask so that the mass ratio of the silane compound was 0.43 parts relative to 1.00 part of silica particles contained in the aqueous silica sol. Subsequently, the resultant mixture was maintained at 23° C. for two hours. The aqueous silica sol subjected to surface treatment with the silane compound (GPS) aggregated and became whitely turbid during a production process, resulting in failure to produce a homogeneous aqueous sol.

[Results of Measurement of Zeta Potential]

FIG. 1 shows the results of measurement of the zeta potentials of the aqueous sols (aqueous silica sols subjected to surface treatment with a silane compound) prepared in Examples 1 and 2 at different pH values from pH 2 or more to pH 10 or less.

As shown in FIG. 1, the aqueous sol of Example 1 exhibited a negative zeta potential at a pH of 6 or less, and the aqueous sol of Example 2 exhibited a positive zeta potential at a pH of 6 or less; i.e., both these aqueous sols did not have an isoelectric point at a pH of 6 or less.

[Test for Stability Against Salt Water]

The aqueous sols of Example 1 and Comparative Example 1 were subjected to a test for stability against salt water (salt water stability test).

The aqueous sol of Example 1 (silica sol containing silica particles subjected to surface treatment with 3-glycidoxy-propyltrimethoxysilane (GPS), silane compound:silica particles=0.43:1 (mass ratio), pH 3.1, DLS average particle diameter: 8.0 nm) or the aqueous sol of Comparative Example 1 (silica sol containing silica particles subjected to surface treatment with 3-glycidoxypropyltriethoxysilane (GPTES), silane compound:silica particles=0.27:1 (mass ratio), pH 8, DLS average particle diameter: 19.0 nm) was added to salt water so as to achieve a silica concentration of 1.0% by mass. In this case, samples for the salt water stability test were prepared so as to achieve a low salt concentration (salt concentration: 35,000 ppm), a medium salt concentration (salt concentration: 175,000 ppm), or a high salt concentration (salt concentration: 229,000 ppm).

An aqueous NaOH solution was added to the sample of Example 1, and an aqueous HCl solution was added to the sample of Comparative Example 1, to thereby prepare aqueous sols having any pH values. The resultant aqueous sols were used for the salt water stability test.

Each of the above-prepared samples was stored at a temperature of 80° C., and the sample was evaluated for a change in average particle diameter as measured by dynamic light scattering (DLS average particle diameter: nm).

Figure 2:
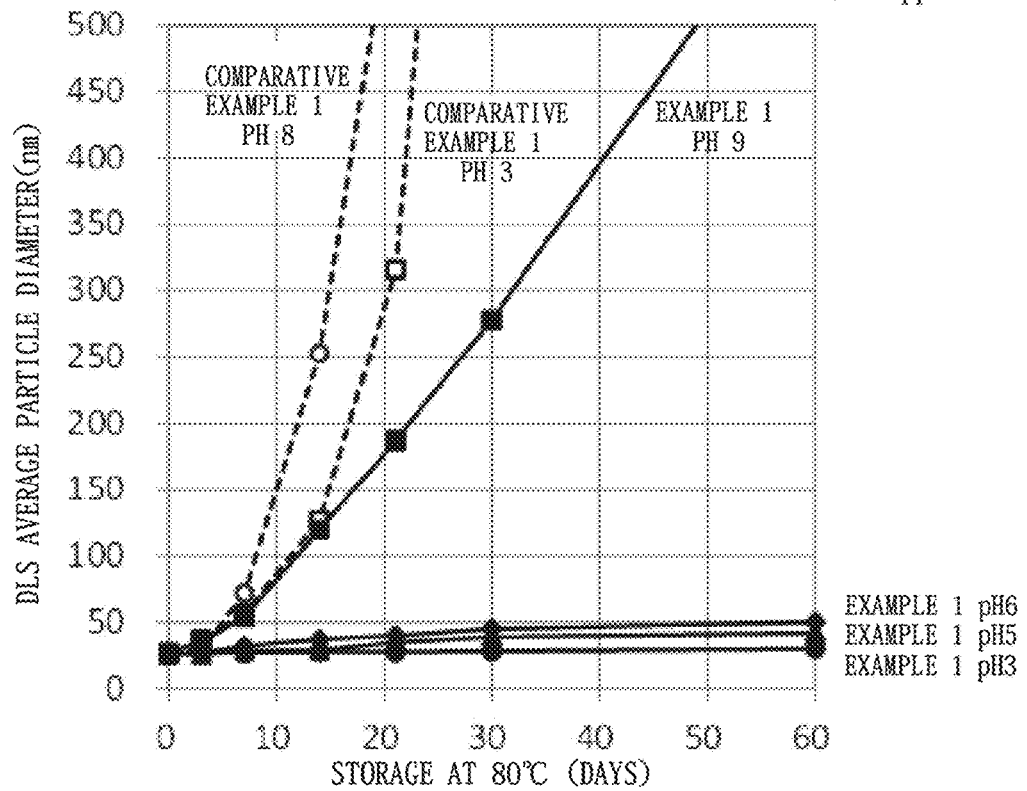
FIG. 2 shows a change in average particle diameter as measured by dynamic light scattering (DLS average particle diameter: nm) during a test for stability against salt water (storage at 80° C., low salt concentration: 35,000 ppm) of the aqueous sols of Example 1 and Comparative Example 1.
Figure 3:
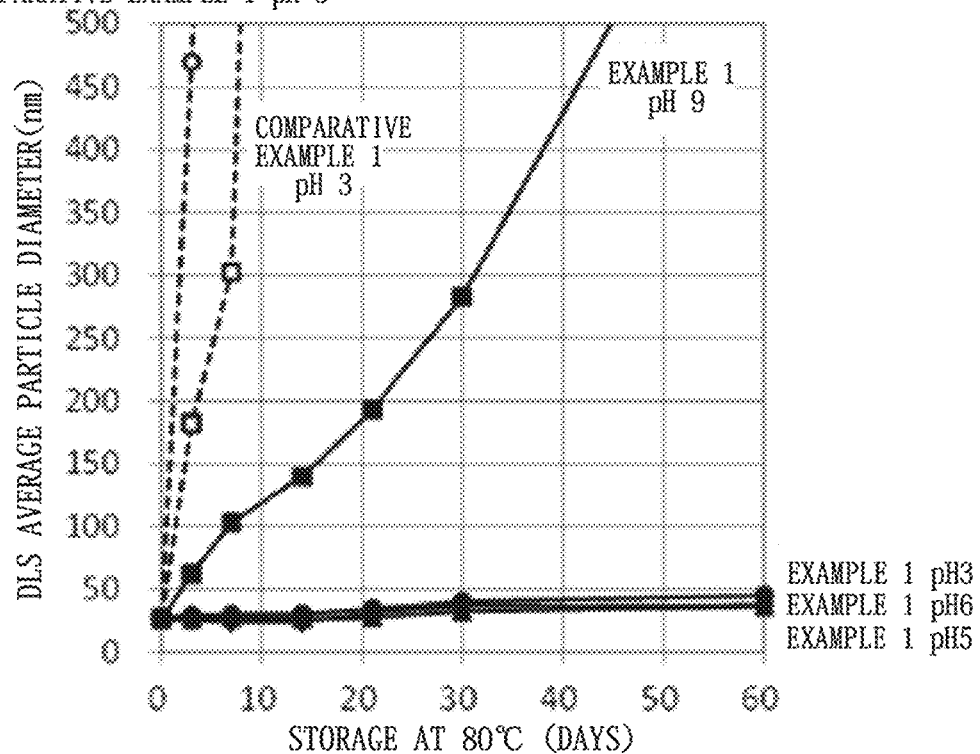
FIG. 3 shows a change in average particle diameter as measured by dynamic light scattering (DLS average particle diameter: nm) during a test for stability against salt water (storage at 80° C., medium salt concentration: 175,000 ppm) of the aqueous sols of Example 1 and Comparative Example 1.
Figure 4:
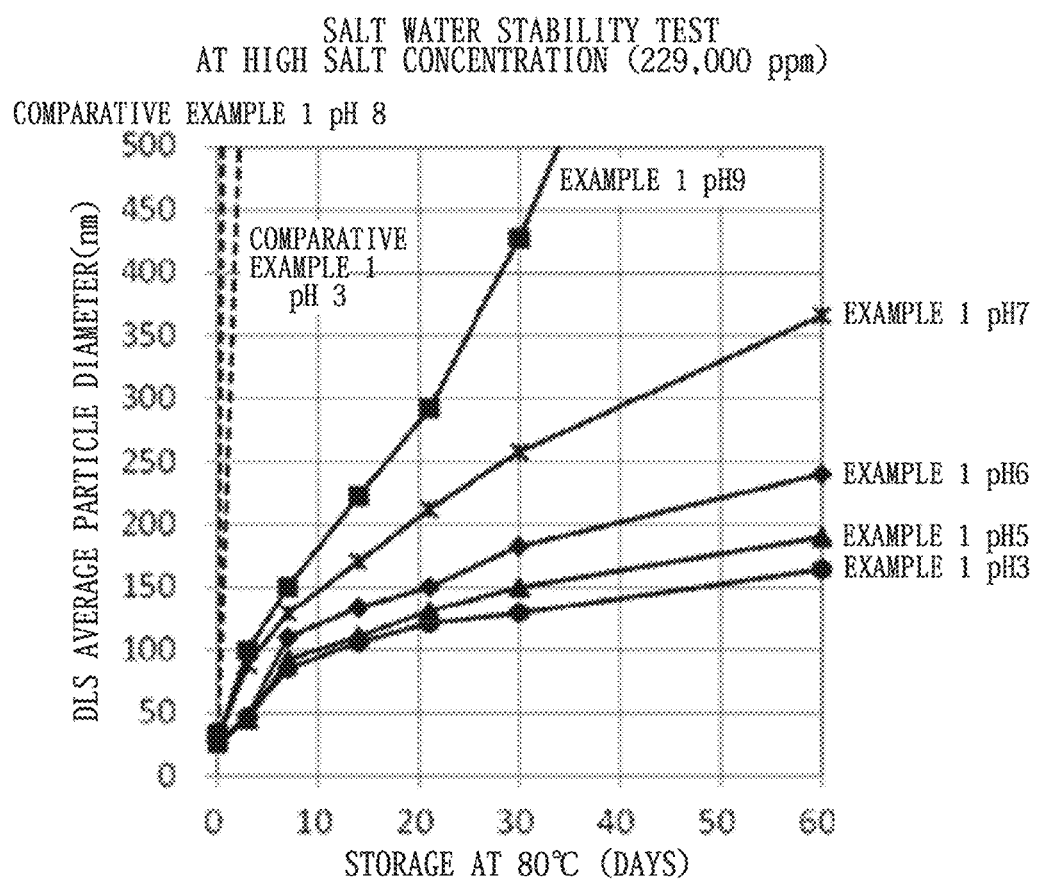
FIG. 4 shows a change in average particle diameter as measured by dynamic light scattering (DLS average particle diameter: nm) during a test for stability against salt water (storage at 80° C., high salt concentration: 229,000 ppm) of the aqueous sols of Example 1 and Comparative Example 1.

The results are shown in FIG. 2 and Table 2 (low salt concentration: 35,000 ppm), FIG. 3 and Table 3 (medium salt concentration: 175,000 ppm), and FIG. 4 and Table 4 (high salt concentration: 229,000 ppm).

In Table 2, "Example 1, pH 3" in the column "Aqueous sol" corresponds to a sample prepared by storing the aqueous sol of Example 1 after pH adjustment to 3, and then diluting the aqueous sol with salt water of low salt concentration (35,000 ppm) so as to achieve a silica concentration of 1.0% by mass. The sample diluted with salt water (pH 6.4) was evaluated for a change in DLS average particle diameter during storage at 80° C.

In Table 2, "Example 1, pH 5" in the column "Aqueous sol" corresponds to a sample prepared by storing the aqueous sol of Example 1 after pH adjustment to 5, and then diluting the aqueous sol with salt water of low salt concentration (35,000 ppm) so as to achieve a silica concentration of 1.0% by mass. The sample diluted with salt water (pH 6.5) was evaluated for a change in DLS average particle diameter during storage at 80° C.

In Table 2, "Example 1, pH 6" in the column "Aqueous sol" corresponds to a sample prepared by storing the aqueous sol of Example 1 after pH adjustment to 6, and then diluting the aqueous sol with salt water of low salt concentration (35,000 ppm) so as to achieve a silica concentration of 1.0% by mass. The sample diluted with salt water (pH 6.7) was evaluated for a change in DLS average particle diameter during storage at 80° C.

In Table 2, "Example 1, pH 9" in the column "Aqueous sol" corresponds to a sample prepared by storing the aqueous sol of Example 1 after pH adjustment to 9, and then diluting the aqueous sol with salt water of low salt concentration (35,000 ppm) so as to achieve a silica concentration of 1.0% by mass. The sample diluted with salt water (pH 7.0) was evaluated for a change in DLS average particle diameter during storage at 80° C.

In Table 2, "Comparative Example 1, pH 8" in the column "Aqueous sol" corresponds to a sample prepared by storing the aqueous sol of Comparative Example 1 after pH adjustment to 8, and then diluting the aqueous sol with salt water of low salt concentration (35,000 ppm) so as to achieve a silica concentration of 1.0% by mass. The sample diluted with salt water (pH 6.9) was evaluated for a change in DLS average particle diameter during storage at 80° C.

In Table 2, "Comparative Example 1, pH 3" in the column "Aqueous sol" corresponds to a sample prepared by storing the aqueous sol of Comparative Example 1 after pH adjustment to 3, and then diluting the aqueous sol with salt water of low salt concentration (35,000 ppm) so as to achieve a silica concentration of 1.0% by mass. The sample diluted with salt water (pH 6.4) was evaluated for a change in DLS average particle diameter during storage at 80° C.

Similarly, samples shown in Tables 3 and 4 were prepared by storing the aqueous sols of Example 1 and Comparative Example 1 after pH adjustment to different values (see pH in the column "Aqueous sol"), and diluting the aqueous sols with salt water of medium salt concentration or high salt concentration so as to achieve a silica concentration of 1.0% by mass and a pH of 5.0 or more to 8.0 or less (see the column "pH of salt water stability test sample"). Each of the samples diluted with salt water was evaluated for a change in DLS average particle diameter during storage at 80° C. for 30 days.

As shown in FIG. 2 and Table 2 (low salt concentration), FIG. 3 and Table 3 (medium salt concentration), and FIG. 4 and Table 4 (high salt concentration), the aqueous sol of Example 1 (pH of 3 or more to 6 or less) exhibited a small change in DLS average particle diameter even after storage at 80° C. for 30 days, as compared with the aqueous sol of Comparative Example 1. However, the aqueous sol of Example 1 (pH of 9) in the case of low salt concentration and medium salt concentration, or the aqueous sol of Example 1 (pH of 7 or more) in the case of high salt concentration exhibited a large change in average particle diameter; specifically, a change in DLS average particle diameter of more than 200 nm between before and after storage for 30 days.

TABLE 2

| | DLS Value, Low Salt Concentration (35,000 ppm) | | | |
|---|---|---|---|---|
| | pH of salt water stability test sample | DLS average particle diameter (nm) | | Change in DLS |
| Aqueous sol | (silica concentration: 1.0% by mass) | Immediately after preparation | After storage at 80° C. for 30 days | particle diameter (nm) |
| Example 1 pH 3 | 6.4 | 26.5 | 28.3 | 1.8 |
| Example 1 pH 5 | 6.5 | 26.8 | 39.1 | 12.3 |

TABLE 2-continued

DLS Value, Low Salt Concentration (35,000 ppm)

| Aqueous sol | pH of salt water stability test sample (silica concentration: 1.0% by mass) | DLS average particle diameter (nm) Immediately after preparation | DLS average particle diameter (nm) After storage at 80° C. for 30 days | Change in DLS particle diameter (nm) |
|---|---|---|---|---|
| Example 1 pH 6 | 6.7 | 26.2 | 45.2 | 19.0 |
| Example 1 pH 9 | 7.0 | 27.1 | 277.6 | 250.5 |
| Comparative Example 1 pH 8 | 6.9 | 27.0 | Unmeasurable | — |
| Comparative Example 1 pH 3 | 6.4 | 26.0 | Unmeasurable | — |

TABLE 3

DLS Value, Medium Salt Concentration (175,000 ppm)

| Aqueous sol | pH of salt water stability test sample (silica concentration: 1.0% by mass) | DLS average particle diameter (nm) Immediately after preparation | DLS average particle diameter (nm) After storage at 80° C. for 30 days | Change in DLS particle diameter (nm) |
|---|---|---|---|---|
| Example 1 pH 3 | 6.3 | 28.0 | 40.5 | 12.5 |
| Example 1 pH 5 | 6.6 | 26.1 | 32.4 | 6.3 |
| Example 1 pH 6 | 6.7 | 26.0 | 37.0 | 11.0 |
| Example 1 pH 9 | 7.3 | 26.3 | 283.0 | 256.7 |
| Comparative Example 1 pH 8 | 7.2 | 27.1 | Unmeasurable | — |
| Comparative Example 1 pH 3 | 6.3 | 27.0 | Unmeasurable | — |

TABLE 4

DLS Value, High Salt Concentration (229,000 ppm)

| Aqueous sol | pH of salt water stability test sample (silica concentration: 1.0% by mass) | DLS average particle diameter (nm) Immediately after preparation | DLS average particle diameter (nm) After storage at 80° C. for 30 days | Change in DLS particle diameter (nm) |
|---|---|---|---|---|
| Example 1 pH 3 | 5.3 | 27.2 | 129.5 | 102.3 |
| Example 1 pH 5 | 5.8 | 26.0 | 150.0 | 124.0 |
| Example 1 pH 6 | 6.0 | 27.1 | 182.6 | 155.5 |
| Example 1 pH 7 | 6.4 | 30.0 | 258.0 | 228.0 |
| Example 1 pH 9 | 6.9 | 30.1 | 428.0 | 397.9 |
| Comparative Example 1 pH 8 | 6.4 | 35.0 | Unmeasurable | — |
| Comparative Example 1 pH 3 | 5.4 | 33.0 | Unmeasurable | — |

[Foamability Test]

Figure 5:
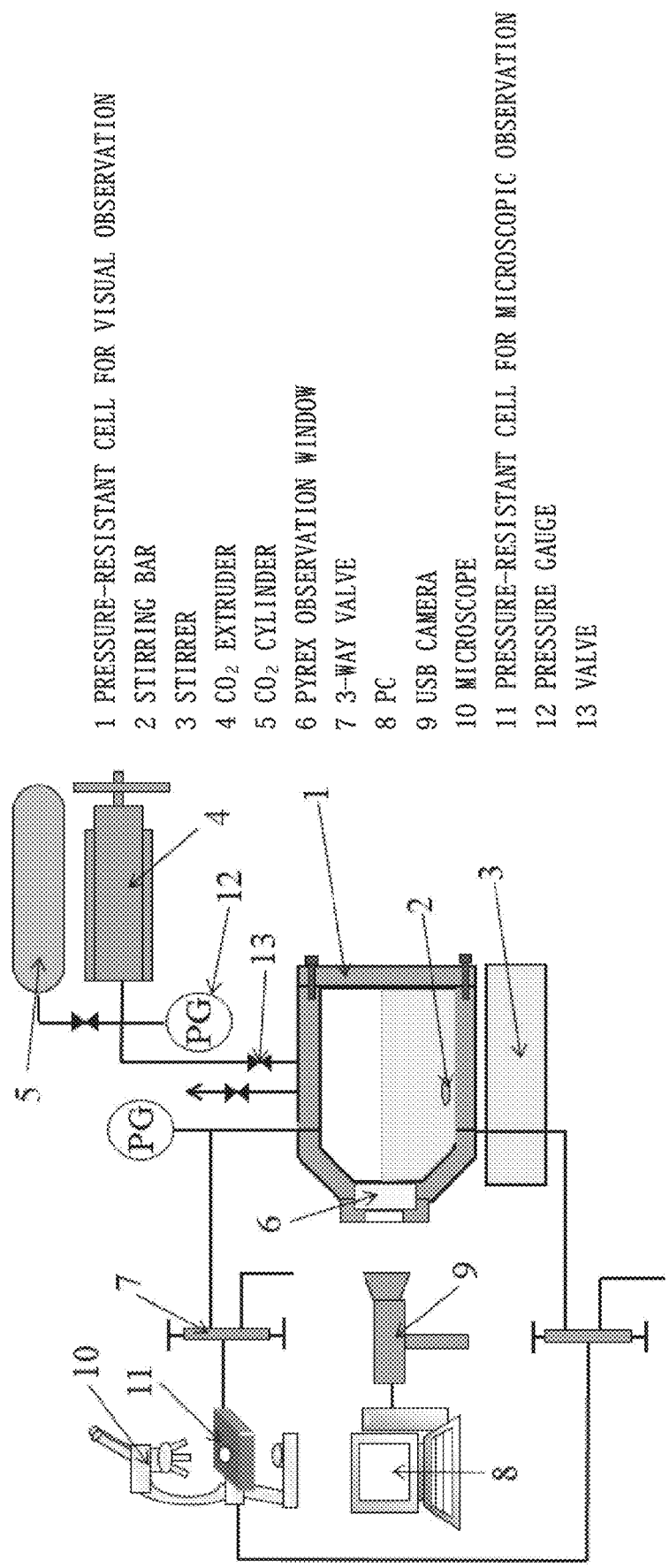
FIG. 5 shows the structure of an apparatus used in a foamability test.

The aqueous sols of Examples 1, 2, 3, and 4 and Comparative Example 1 were subjected to a foamability test using an apparatus shown in FIG. 5 through the following procedure.

Salt water containing each of the aqueous silica sols subjected to surface treatment (the aqueous sols of Examples 1 to 4 and Comparative Example 1) (silica concentration: 1.0% by mass) was placed in a pressure-resistant cell for visual observation having an observation window (available from TAMASEIKI IND. Co., Ltd., volume: 150 mL). Thereafter, the pressure-resistant cell was heated to a temperature of 100° C., and carbon dioxide (available from Nippon Ekitan Corporation, purity: 99.99% or more) was injected into the cell until the internal pressure reached 100 atm, 200 atm, or 300 atm. The aqueous silica sol was stirred with a stirring bar at a rotation speed of 1,000 to 1,500 rpm for 15 minutes, and then the stirring was terminated to thereby allow the sol to stand still. The foamability was evaluated by visual observation of the state of formation of froth or emulsion through the observation window.

<Foamability Test 1>

The aqueous sols of Examples 1 and 2 and Comparative Example 1 were subjected to a foamability test using a crude oil substitute (n-decane).

The aqueous sol of Example 1 (silica sol containing silica particles subjected to surface treatment with 3-glycidoxypropyltrimethoxysilane (GPS), silane compound:silica particles=0.43:1 (mass ratio)), the aqueous sol of Example 2 (silica sol containing silica particles subjected to surface treatment with 3-aminopropyltriethoxysilane (APTES) and phenyltrimethoxysilane (PTMS), silane compound:silica particles=0.35:1 (mass ratio)), or the aqueous sol of Comparative Example 1 (silica sol containing silica particles subjected to surface treatment with 3-glycidoxypropyltriethoxysilane (GPTES), silane compound:silica particles=0.27:1 (mass ratio)) was added to salt water so as to achieve a silica concentration of 1.0% by mass, to thereby prepare three salt water samples (salt concentration: 229,000 ppm (salt water of high salt concentration)) for foamability test 1.

Each salt water sample for foamability test 1 was mixed with carbon dioxide so as to achieve (a) the salt water sample:carbon dioxide=50:50 (proportions by volume) or mixed with carbon dioxide and decane so as to achieve (b) the salt water sample:carbon dioxide:decane=20:60:20 (proportions by volume), and the resultant mixture was stirred at a temperature of 100° C. and a pressure of 100 atm, 200 atm, or 300 atm with a stirring bar at a rotation speed of 1,500 rpm for 15 minutes.

Figure 6:
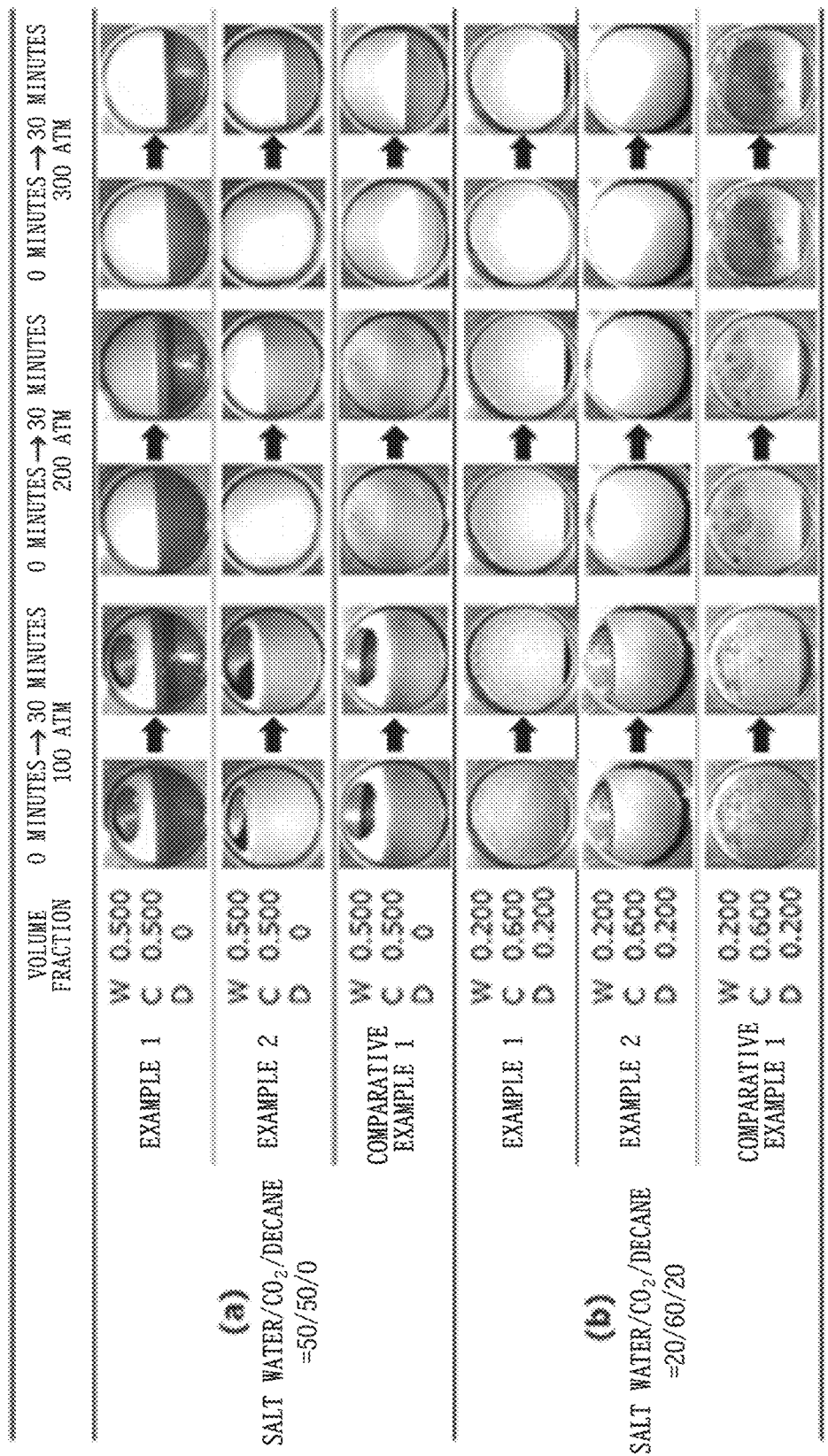
FIG. 6 shows the results of a foamability test of the aqueous sols of Examples 1 and 2 and Comparative Example 1.

FIG. 6 shows observation photographs of the mixture samples immediately after termination of the stirring (0 min) and after being allowed to stand still for 30 minutes.

In the observation photographs shown in FIG. 6 and FIGS. 7 and 8 below, the cloudy portion (uniform white portion) in each circle (observation window) indicates the formation of froth or emulsion, and the dark portion on the lower side of the circle indicates salt water. The observation of voids or color unevenness in the cloudy portion of the circle indicates insufficient formation of froth or emulsion. The formation of froth or emulsion enables it to enter pores in the rock core and function in recovering crude oil.

As shown in FIG. 6(a), the sample prepared by mixing the salt water sample for foamability test 1 ("SALT WATER" shown in FIG. 6) and carbon dioxide in proportions by volume of 50/50 using each of the aqueous sols of Examples 1 and 2 exhibited high foamability.

As shown in FIG. 6(b), the sample prepared by mixing the salt water sample for foamability test 1, carbon dioxide, and the crude oil substitute (n-decane) in proportions by volume of 20/60/20 using each of the aqueous sols of Examples 1 and 2 exhibited high foamability.

These results suggest that the aqueous sols of Examples 1 and 2 have high ability to sweep crude oil in pores of the core sample.

In contrast, in the case of the Comparative Example, voids or color unevenness was observed on the upper side of the circle immediately after termination of the 15-minute stirring (0 min) and even after being allowed to stand still for 30 minutes (i.e., insufficient formation of froth or emulsion), particularly as shown in the results of the test using the crude oil substitute (FIG. 6(b)). The results suggest that the aqueous sol of the Comparative Example have poor ability to sweep crude oil.

<Foamability Test 2>

The aqueous sols of Examples 3 and 4 and Comparative Example 1 were subjected to a foamability test.

The aqueous sol of Example 3 (silica sol containing silica particles subjected to surface treatment with 3-glycidoxypropyltrimethoxysilane (GPS) and epoxycyclohexylethyltrimethoxysilane (EPCHS), silane compound:silica particles=0.65:1 (mass ratio)), the aqueous sol of Example 4 (silica sol containing silica particles subjected to surface treatment with 3-glycidoxypropyltrimethoxysilane (GPS) and epoxycyclohexylethyltrimethoxysilane (EPCHS), silane compound:silica particles=0.49:1 (mass ratio)), or the aqueous sol of Comparative Example 1 (silica sol containing silica particles subjected to surface treatment with 3-glycidoxypropyltriethoxysilane (GPTES), silane compound:silica particles=0.27:1 (mass ratio)) was added to salt water so as to achieve a silica concentration of 1.0% by mass, to thereby prepare three salt water samples (salt concentration: 14,000 ppm (domestic oil field formation water)) for foamability test 2.

Each salt water sample for foamability test 2 was mixed with carbon dioxide so as to achieve the salt water sample:carbon dioxide=50:50 (proportions by volume), and the resultant mixture was stirred at a temperature of 100° C. and a pressure of 185 atm or 300 atm with a stirring bar at a rotation speed of 1,000 rpm, 1,250 rpm, or 1,500 rpm for 15 minutes.

Figure 7:
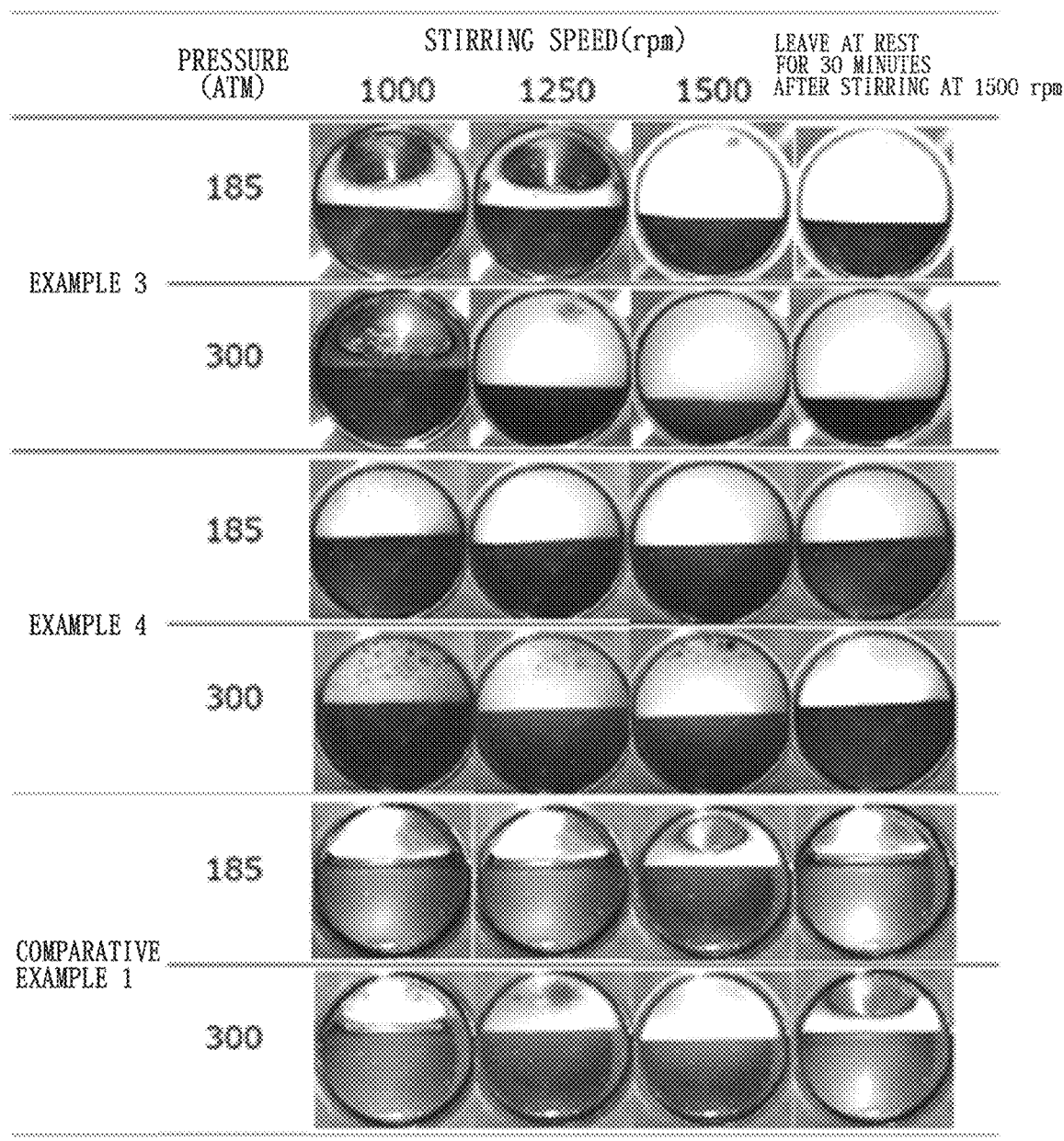
FIG. 7 shows the results of a foamability test of the aqueous sols of Examples 3 and 4 and Comparative Example 1.

FIG. 7 shows observation photographs of the mixture samples immediately after termination of the stirring and after being allowed to stand still for 30 minutes following the 15-minute stirring at 1,500 rpm.

As shown in FIG. 7, the sample prepared by using each of the aqueous sols of Examples 3 and 4 exhibited high foamability. The results suggest that the aqueous sols of Examples 3 and 4 have high ability to sweep crude oil in pores of the rock core.

<Foamability Test 3: Long-Term Stability Test of Froth or Emulsion>

The aqueous sol of Example 1 (silica sol containing silica particles subjected to surface treatment with 3-glycidoxypropyltrimethoxysilane (GPS), silane compound:silica particles=0.43:1 (mass ratio)) or the aqueous sol of Example 2 (silica sol containing silica particles subjected to surface treatment with 3-aminopropyltriethoxysilane (APTES) and phenyltrimethoxysilane (PTMS), silane compound:silica particles=0.35:1 (mass ratio)) was added to salt water so as to achieve a silica concentration of 1.0% by mass, to thereby prepare two salt water samples (salt concentration: 229,000 ppm (salt water of high salt concentration)) for foamability test 3.

Each salt water sample for foamability test 3 was mixed with carbon dioxide and decane so as to achieve the salt water sample:carbon dioxide:decane=20:60:20 (proportions by volume), and the resultant mixture was stirred at a temperature of 100° C. and a pressure of 200 atm with a stirring bar at a rotation speed of 1,500 rpm for 15 minutes.

Figure 8:
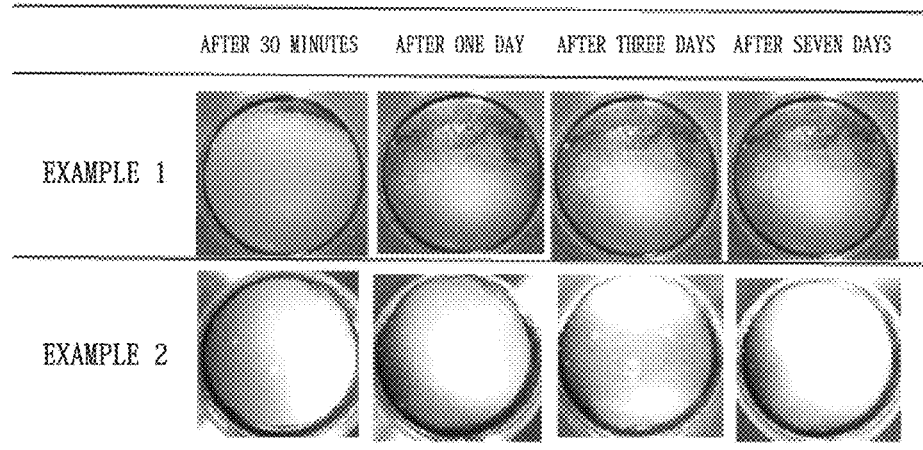
FIG. 8 is a photograph showing the results of a long-term stability test of froth or emulsion 30 minutes, one day, three days, and seven days after the termination of stirring in the foamability test of the aqueous sols of Examples 1 and 2.

FIG. 8 shows observation photographs of the mixture samples after being allowed to stand still for 30 minutes, one day, three days, and seven days following termination of the stirring.

As shown in FIG. 8, the sample prepared by using each of the aqueous sols of Examples 1 and 2 maintained high foamability even after being allowed to stand still for seven days. The results indicate that the formed froth or emulsion exhibits excellent long-term stability.

<Observation of Froth or Emulsion>

The aqueous sol of Example 1 (silica sol containing silica particles subjected to surface treatment with 3-glycidoxypropyltrimethoxysilane (GPS), silane compound:silica particles=0.43:1 (mass ratio)) was added to salt water so as to achieve a silica concentration of 1.0% by mass, to thereby prepare a salt water sample (salt concentration: 229,000 ppm (salt water of high salt concentration), pH 5.2) for observation of froth or emulsion.

A water-soluble dye (methyl orange) of the following Formula (1) was added to the salt water sample for observation of froth or emulsion so that the dye content of the salt water was 0.3% by mass.

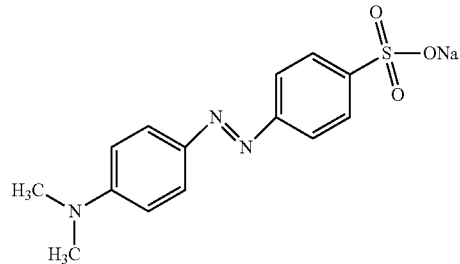

Formula (1)

The salt water sample for observation of froth or emulsion was mixed with carbon dioxide and decane so as to achieve the salt water sample:carbon dioxide:decane=50:30:20 (proportions by volume), and the resultant mixture was stirred at a temperature of 100° C. and a pressure of 100 atm to 300 atm with a stirring bar at a rotation speed of 1,500 rpm for 15 minutes.

The stirred sample was transferred from the pressure-resistant cell for visual observation of the apparatus used for the foamability test shown in FIG. 5 to a pressure-resistant cell for microscopic observation, and the state of froth or emulsion was observed with an optical microscope.

Figure 9:
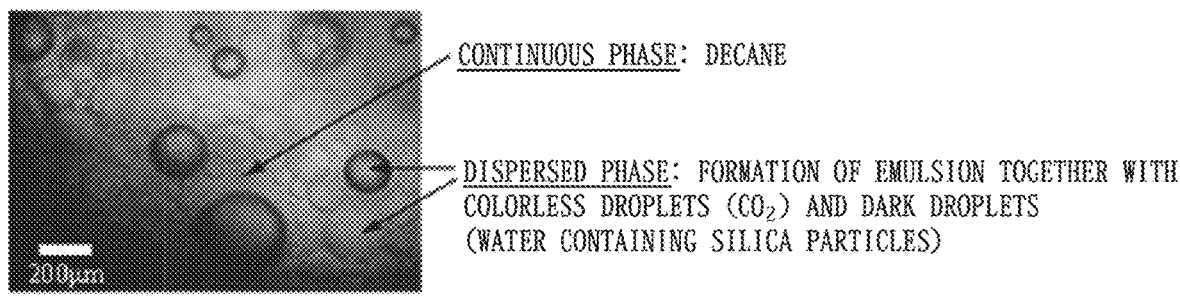
FIG. 9 is an optical microscope photograph of W/O emulsion formed at a pressure of 100 atm by addition of a water-soluble dye to a salt water sample (salt concentration: 229,000 ppm) containing the aqueous sol of Example 1 (silica concentration: 1.0% by mass).
Figure 10:
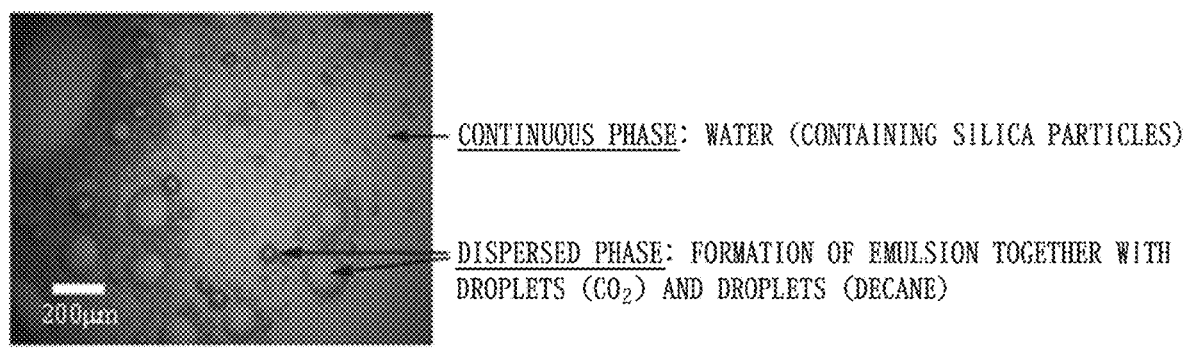
FIG. 10 is an optical microscope photograph of O/W emulsion formed at a pressure of 100 atm by addition of a water-soluble dye to a salt water sample (salt concentration: 229,000 ppm) containing the aqueous sol of Example 1 (silica concentration: 1.0% by mass).
Figure 11:
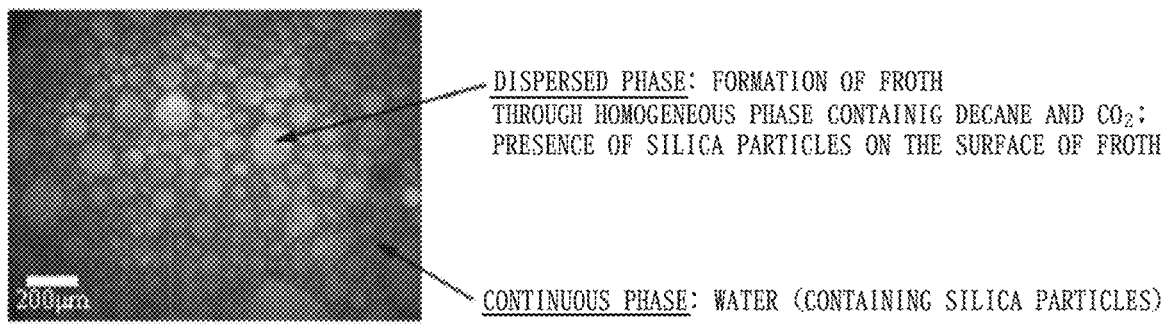
FIG. 11 is an optical microscope photograph of froth formed at a pressure of 300 atm by addition of a water-soluble dye to a salt water sample (salt concentration: 229,000 ppm) containing the aqueous sol of Example 1 (silica concentration: 1.0% by mass).

FIGS. 9 and 10 are optical microscope photographs showing emulsion each formed at a pressure of 100 atm, and FIG. 11 is an optical microscope photograph showing froth formed at a pressure of 300 atm.

Figure 12:
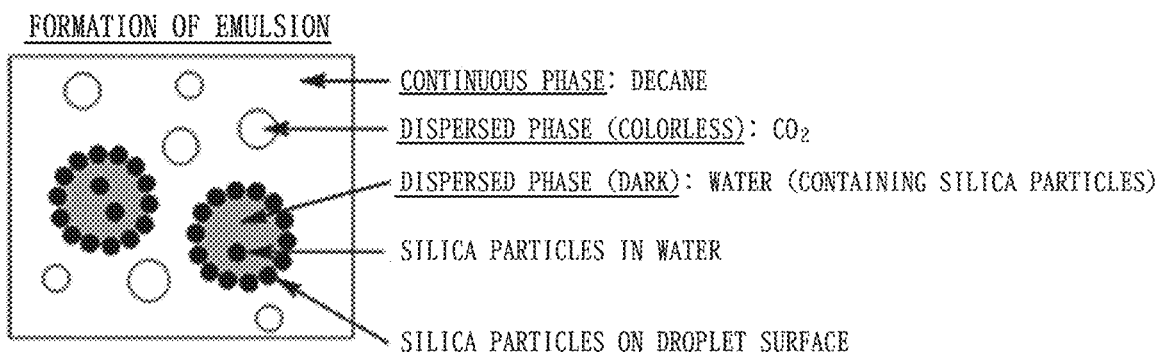
FIG. 12 is a schematic view of W/O emulsion formed at a pressure of 100 atm by addition of a water-soluble dye to a salt water sample (salt concentration: 229,000 ppm) containing the aqueous sol of Example 1 (silica concentration: 1.0% by mass).
Figure 13:
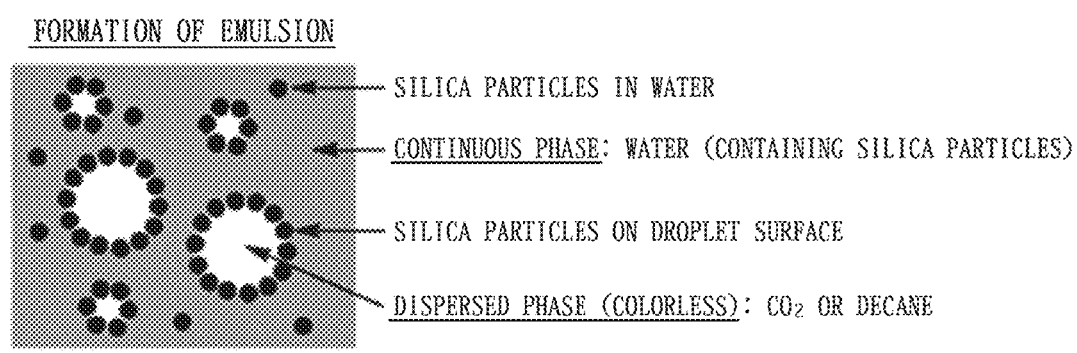
FIG. 13 is a schematic view of O/W emulsion formed at a salt water sample (salt concentration: 229,000 ppm) containing the aqueous sol of Example 1 (silica concentration: 1.0% by mass).
Figure 14:
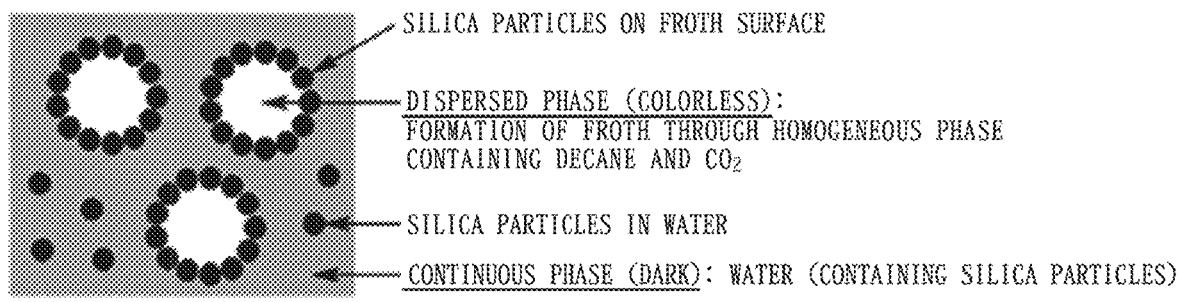
FIG. 14 is a schematic view of froth formed at a pressure of 300 atm by addition of a water-soluble dye to a salt water sample (salt concentration: 229,000 ppm) containing the aqueous sol of Example 1 (silica concentration: 1.0% by mass).

FIGS. 12 and 13 are schematic views each showing the formation of the emulsion, and FIG. 14 is a schematic view showing the formation of the froth.

FIG. 9 (see the schematic view of FIG. 12) shows W/O emulsion containing a continuous phase formed of decane, and a dispersed phase formed by coexistence of colorless droplets (carbon dioxide) and dark droplets (water containing silica particles). As shown in FIG. 12, each dark droplet (dispersed phase formed of water containing silica particles) is formed of silica particles on the surface of the droplet, internal water, and silica particles in the water.

FIG. 10 (see the schematic view of FIG. 13) shows O/W emulsion containing a continuous phase formed of water containing silica particles, and a dispersed phase formed by coexistence of droplets (carbon dioxide) and droplets (decane). As shown in FIG. 13, the continuous phase is formed of water and silica particles in the water, and the dispersed phase is formed of carbon dioxide or decane (droplets) wherein silica particles are present on the surface of each droplet.

FIG. 11 (see the schematic view of FIG. 14) shows a dispersed phase containing froth formed of a homogeneous phase containing decane and carbon dioxide and silica particles present on the surface of the froth, and a continuous phase formed of water containing silica particles.

[Composition and Profile Observation of Rock Core Sample]

The compositional data of a rock core sample used for evaluation of crude oil recovery described below were obtained through the aforementioned procedure, and the profile of the rock core sample was observed.

The rock core sample used was a sandstone sample ($SiO_2$ type) of Berea Sandstone (available from Core Lab Instruments, hereinafter referred to as "BSS") or a carbonate rock sample ($CaCO_3$ type) of Indiana 200md (available from Kocurek, hereinafter referred to as "IN 200md").

The rock core sample (sandstone sample or carbonate rock sample) used for various evaluation tests was a cylindrical sample having a diameter of 1.5 inches and a length of 1 foot (about 3.8 cm in diameter×30.5 cm in length) prepared by reflux-extraction washing with toluene for removal of oil and water followed by one-day drying at 120° C., and then reflux-extraction washing with methanol for removal of salt followed by one-day drying at 80° C.

Figure 15:
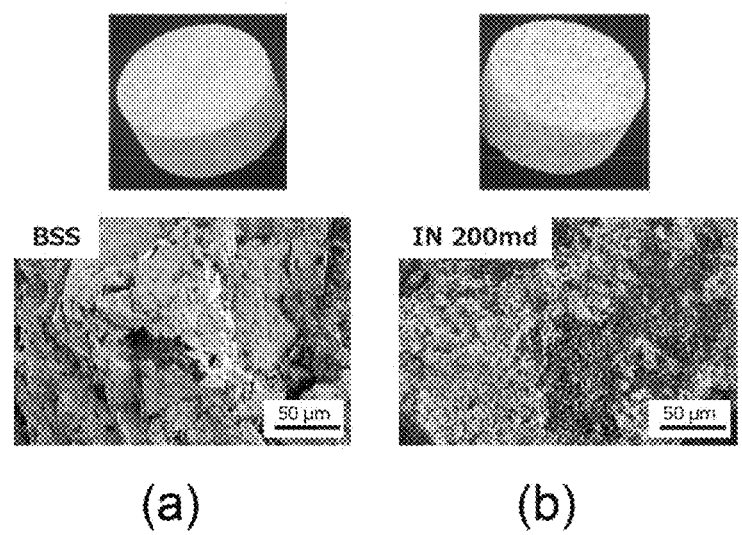
FIG. 15 is a photograph showing the appearances of (a) sandstone (Berea Sandstone (BSS)) and (b) carbonate rocks (Indiana 200md (IN 200md)) used for evaluation of crude oil recovery, and the results of observation of the surface profiles of these cores (scanning electron microscope photographs (magnification: 500)).

Table 5 shows the resultant compositional data of each sample (fluorescent X-ray analysis, composition in terms of oxide). FIG. 15 is a photograph showing the appearances of rock core samples, as well as the results of observation of the surface profiles of the samples (scanning electron microscope photographs (magnification: 500)) (FIG. 15(a): sandstone (BSS), FIG. 15(b): carbonate rocks (IN 200md)).

TABLE 5

Rock Core Sample (Composition in terms of oxides)

| Component (% by mass) | Sandstone ($SiO_2$ type) BSS | Carbonate rocks ($CaCO_3$ type) IN 200 md |
|---|---|---|
| $SiO_2$ | 88.5 | 0.6 |
| $Al_2O_3$ | 6.6 | — |
| CaO | 1.1 | 98.0 |
| MgO | 0.5 | 0.4 |
| $Fe_2O_3$ | 1.9 | 0.8 |
| $K_2O$ | 1.4 | 0.2 |

[Pore Volume and Air Permeability of Rock Core Sample]

The porosity and air permeability of the aforementioned rock core sample were measured to thereby determine the pore volume thereof.

The porosity was measured with a helium porosimeter (available from Core Lab Instruments).

The air permeability was measured with an air permeameter (available from Core Lab Instruments).

These measurements were performed on five samples of sandstone (BSS) and nine samples of carbonate rocks (IN 200md). The results are shown in Tables 6 and 7.

TABLE 6

Pore Volume and Air Permeability of Sandstone Sample

| Sandstone sample | Pore volume (cc) | Porosity (%) | Air permeability (md) |
|---|---|---|---|
| Berea Sandstone-1 | 64.8 | 19.3 | 252 |
| Berea Sandstone-2 | 64.3 | 19.0 | 251 |
| Berea Sandstone-3 | 64.4 | 19.1 | 255 |
| Berea Sandstone-4 | 64.5 | 19.0 | 252 |
| Berea Sandstone-5 | 64.5 | 19.0 | 251 |

TABLE 7

Pore Volume and Air Permeability of Carbonate Rock Sample

| Carbonate rock sample | Pore volume (cc) | Porosity (%) | Air permeability (md) |
|---|---|---|---|
| Indiana 200md-1 | 53.5 | 15.5 | 217 |
| Indiana 200md-2 | 51.6 | 15.0 | 107 |
| Indiana 200md-3 | 51.9 | 15.1 | 177 |
| Indiana 200md-4 | 48.3 | 14.0 | 111 |
| Indiana 200md-5 | 44.9 | 13.0 | 64 |
| Indiana 200md-6 | 50.5 | 14.6 | 253 |
| Indiana 200md-7 | 49.3 | 14.3 | 76 |
| Indiana 200md-8 | 52.4 | 15.2 | 320 |
| Indiana 200md-9 | 49.9 | 14.5 | 160 |

Figure 16:
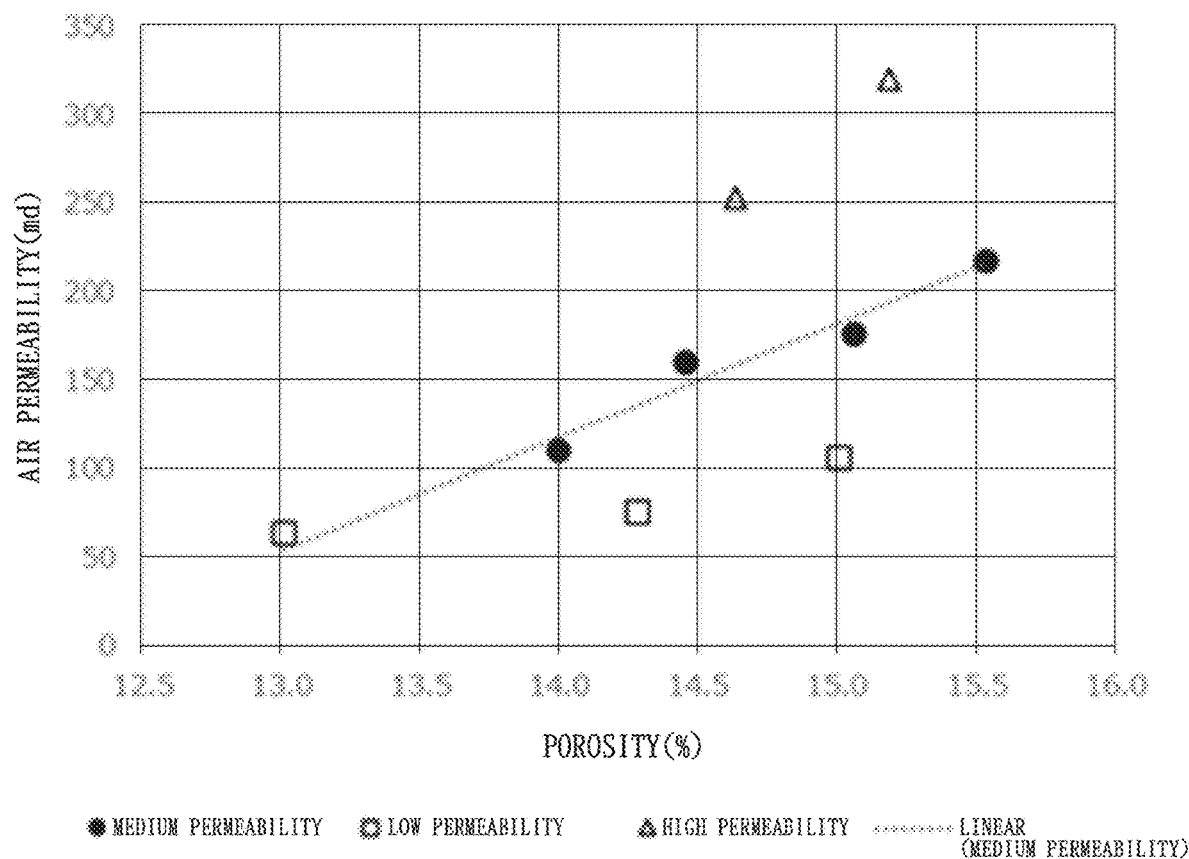
FIG. 16 shows the relationship between the air permeability and porosity of a carbonate rock sample.

The carbonate rock samples (IN 200md) used for crude oil recover evaluation described below were selected as follows. Specifically, on the basis of the K (air permeability)-Phi (porosity) plot shown in FIG. 16, core samples of low permeability (□) and core samples of high permeability (Δ) were eliminated, and rock core samples of medium permeability (air permeability: about 150±50 md) (●) were selected and used for evaluation of crude oil recovery.

[Evaluation of Crude Oil Recovery Using Rock Core Sample]

The aqueous sol prepared in Example 1 was evaluated for crude oil recovery (assuming subsurface oil reservoir) through the procedure described below by using the core flow test apparatus (pipe and equipment layout) shown in FIG. 17 and using Middle East crude oil and rock core samples (sandstone (BSS) and carbonate rocks (IN 200md)).

Figure 17:
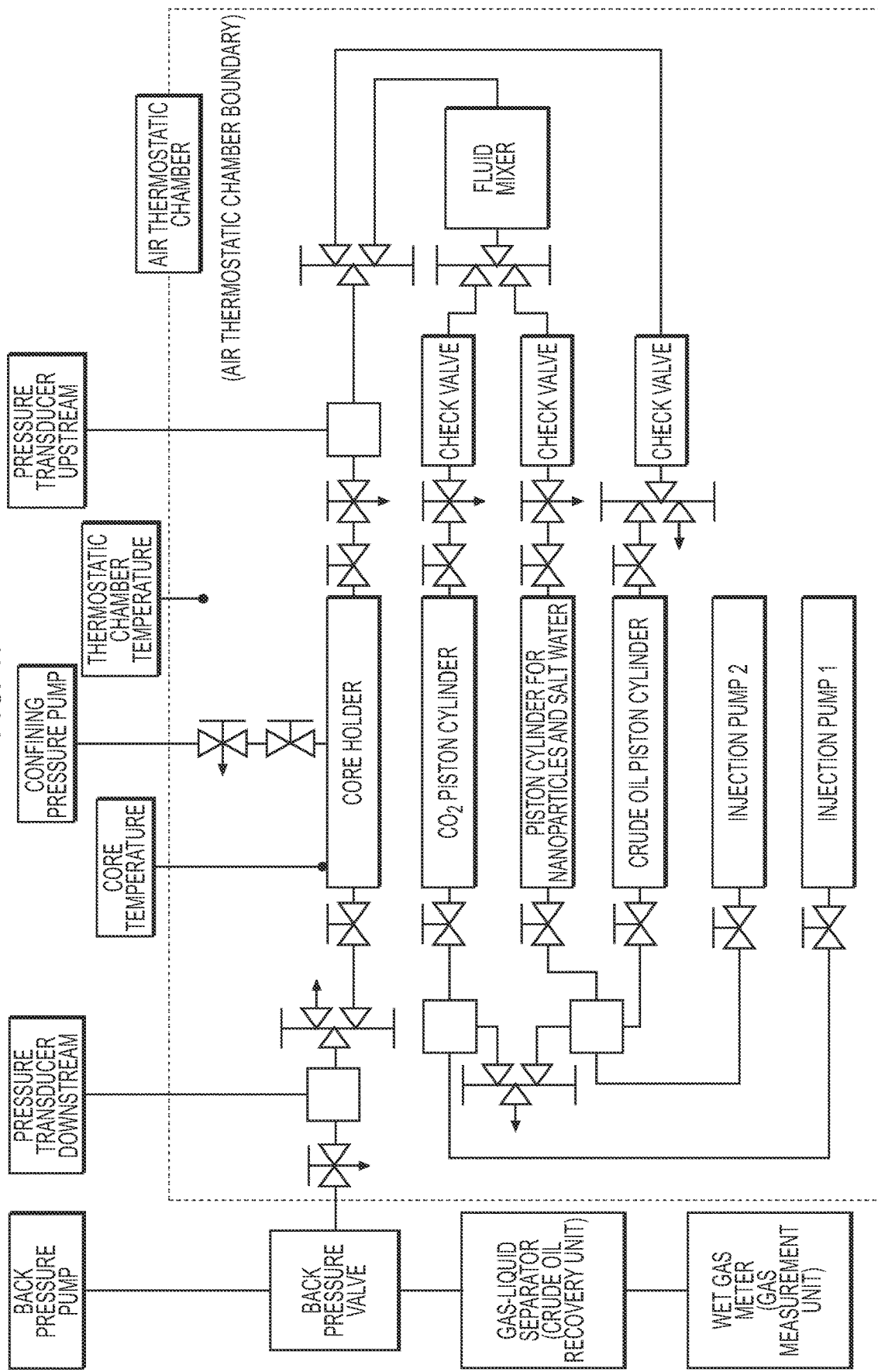
FIG. 17 shows the pipe and equipment layout of a core flow test apparatus used for evaluation of crude oil recovery.

As shown in FIG. 17, the core flow test apparatus includes injection pumps (available from Schlumberger), a $CO_2$ piston cylinder for fluid charging, a piston cylinder for nanoparticles and salt water, and a crude oil piston cylinder (available from VINCI Technologies), a core holder (available from VINCI Technologies), a confining pressure pump (available from VINDUM ENGINEERING), a back pressure valve and a back pressure pump (available from VINCI Technologies), a gas-liquid separator (crude oil recovery unit) for a recovered fluid (available from VINCI Technologies), a wet gas meter for measuring the amount of free gas (available from Shinagawa Corporation), a pressure transducer (available from VALCOM), a resistance thermometer bulb for measuring a core temperature, a thermostatic chamber temperature, and a free gas temperature (available from Chino Corporation), and an air thermostatic chamber (available from Sunaka Rika Kogyo K. K.). The upstream and downstream pressures of the core holder, the confining pressure (lateral pressure) of the core holder, the pressure for control of the back pressure valve, the temperatures of the core and the thermostatic chamber, and the amount and temperature of the free gas were recorded every second by a computer via a data logger (available from GRAPHTEC).

Test Example 1: Evaluation of Crude Oil Recovery Using Sandstone (BSS)

A sandstone (BSS) core sample (one sample) inserted in a rubber sleeve was placed in the core holder shown in FIG. 17, and the pores of the sandstone (BSS) core were vacuumed, followed by vacuuming of the annular space between the rubber sleeve and the inner wall of the core holder (annular space for fluid charging by confining pressure (lateral pressure)). After the annular space was saturated with a pressurized fluid from the confining pressure pump by atmospheric pressure suction, the confining pressure (lateral pressure) was increased to 68.0 atm with the confining pressure pump, to thereby determine no leakage into the pores of the sandstone (BSS) core and to the exterior. The back pressure valve was set to 200 atm (i.e., test conditions) with the back pressure pump. The injection pump 2 was connected to the crude oil piston cylinder, and the crude oil was introduced into the vacuumed pores of the sandstone (BSS) core, followed by pressurization to 34.0 atm and control of the pump at constant pressure. In order to achieve the differential pressure set for the crude oil recovery evaluation test (back-pressure setting pressure+68.0 atm (1,000 psi)), the confining pressure (lateral pressure) was increased to 102.0 atm, and the amount of the introduced crude oil was recorded. The preliminarily measured dead volume between the upstream and downstream valves of the core holder was subtracted from the amount of the introduced crude oil at a differential pressure of 68.0 atm, to thereby determine the 100% crude oil saturation volume of the core pores, which was used as the core pore volume for calculation of the crude oil recovery rate. While checking that there is no leakage, the confining pressure (lateral pressure) and then the pressure in the core pores were increased in increments of 34.0 atm, and the confining pressure (lateral pressure) and the pressure in the core pores were set to 268.1 atm and 200.0 atm (test pressures), respectively. The injection pump 2 was set to constant flow rate control, and the crude oil was injected at a low flow rate, to thereby determine the operation of the back pressure valve and the signal output status of the pressure transducer. The upstream valve of the crude oil piston cylinder was closed, and the internal pressure of the piston cylinder for fluid charging was controlled at a constant pressure of 200 atm by the injection pumps 1 and 2. The air thermostatic chamber was heated from room temperature in increments of 10° C., and the temperature of the air thermostatic chamber was maintained at 100° C. (test temperature). Regarding the fluid expansion volume during an increase in temperature, the internal pressure of the piston cylinder for fluid charging was maintained at 200 atm by the injection pumps 1 and 2, the crude oil in the core holder was discharged from the back pressure valve and maintained at 200 atm, and the confining pressure (lateral pressure) was maintained at 268.1 atm by the confining pressure pump.

Subsequently, the liquid prepared with salt water (silica concentration: 1.0% by mass, salt concentration: 175,000 ppm (salt water of medium salt concentration)) containing the aqueous sol of Example 1 (silica sol containing silica particles subjected to surface treatment with 3-glycidoxypropyltrimethoxysilane (GPS)) was injected from the piston cylinder for nanoparticles and salt water, and carbon dioxide was injected from the $CO_2$ piston cylinder. The salt water-prepared liquid and carbon dioxide were simultaneously injected at a ratio of 1:1 at a flow rate of 4 feet/day into the sandstone (BSS) core sample saturated with the crude oil in the core holder. For Comparative Test Example, only carbon dioxide was injected at a flow rate of 4 feet/day into the core sample saturated with the crude oil. The injection fluid was injected into the core sample at 100° C., a back-pressure control pressure of 200 atm, and a confining pressure (lateral pressure) of 268.1 atm. The injection was performed until the volume of the injection fluid reacted 120% relative to the pore volume of the core sample.

The crude oil recovery rate was calculated from the amount of the crude oil recovered from the pores of the sandstone (BSS) core sample by the injection of the injection fluid (the aqueous sol of Example 1, the salt water, and carbon dioxide) into the core sample. The results are shown in FIG. 18 and Table 8.

Also, the liquid prepared with salt water (silica concentration: 1.0% by mass, salt concentration: 175,000 ppm (salt water of medium salt concentration)) containing the aqueous sol of Example 2 (silica sol containing silica particles subjected to surface treatment with 3-aminopropyltriethoxysilane (APTES) and phenyltrimethoxysilane (PTMS)) was used, and the crude oil recovery rate was evaluated through the same procedure as described above. The results are also shown in FIG. 18 and Table 8.

Figure 18:
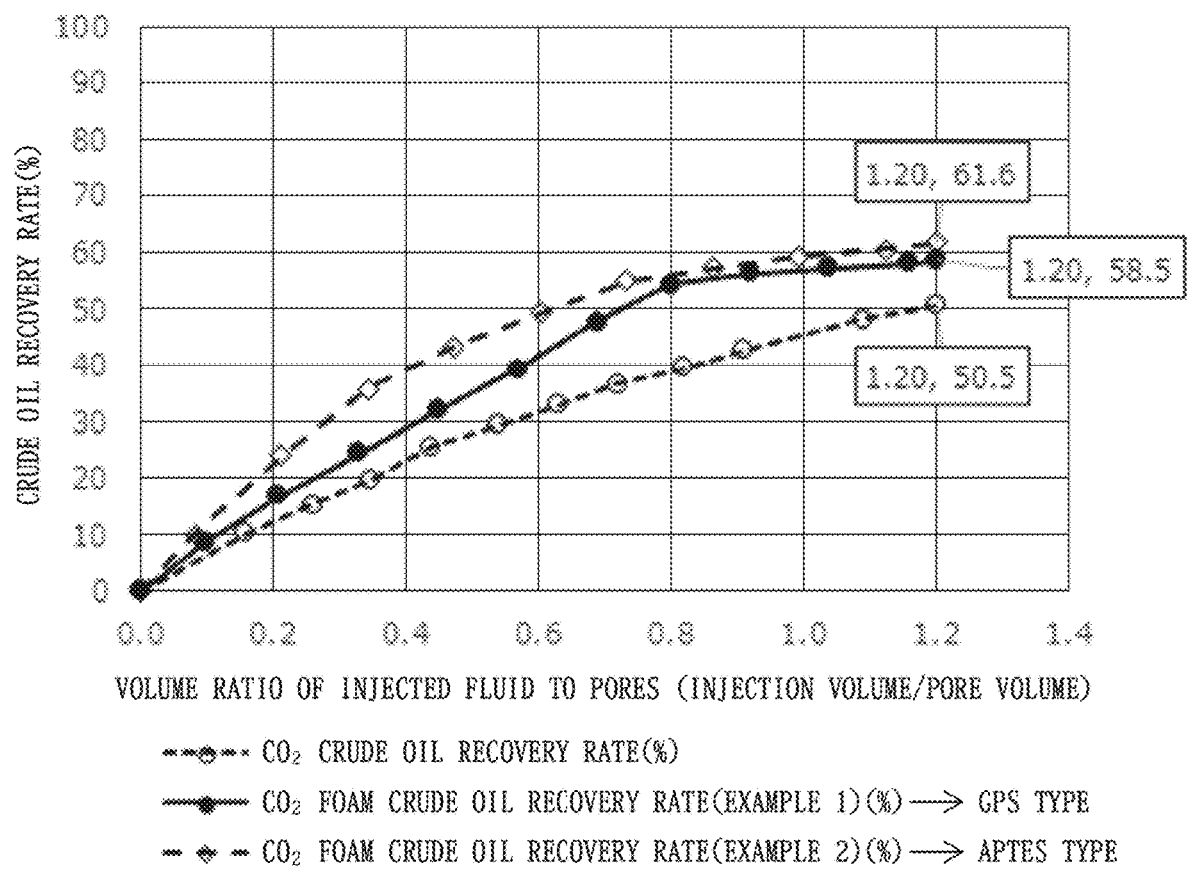
FIG. 18 shows the amount (%) of crude oil (vertical axis) recovered from pores of a sandstone (BSS) core sample with respect to the amount of injection (horizontal axis) of a fluid (salt water containing the aqueous sol of Example 1 or 2 (silica concentration: 1.0% by mass), carbon dioxide) when the total rock pore volume of the core sample is taken as 1.0.

FIG. 18 and Table 8 show the amount of injection (the volume ratio of the injected fluid to the pores (injection volume/pore volume):PV) of the fluid (the aqueous sol of Example 1 or Example 2, the salt water, and carbon dioxide) (corresponding to the horizontal axis), and the amount (%) of the crude oil recovered from the pores of the sandstone (BSS) core sample (corresponding to the vertical axis) when the total rock pore volume of the core sample is taken as 1.0. In FIG. 18, the symbol "●" corresponds to the results of simultaneous injection of the salt water (silica concentration: 1.0% by mass, salt concentration: 175,000 ppm) containing the aqueous sol of Example 1 (silica sol containing silica particles subjected to surface treatment with 3-glycidoxypropyltrimethoxysilane (GPS)) and carbon dioxide at a ratio of 1:1 at a flow rate of 4 feet/day; the symbol "◊" corresponds to the results of simultaneous injection of the salt water (silica concentration: 1.0% by mass, salt concentration: 175,000 ppm) containing the aqueous sol of Example 2 (silica sol containing silica particles subjected to surface treatment with 3-aminopropyltriethoxysilane (APTES) and phenyltrimethoxysilane (PTMS)) and carbon dioxide at a ratio of 1:1 at a flow rate of 4 feet/day; and the symbol "○" corresponds to the results of injection of only carbon dioxide at a flow rate of 4 feet/day.

As shown in FIG. 18 and Table 8, when the amount of injection of the fluid into the pores of the sandstone (BSS) core sample reached 1.20 (120%), the crude oil recovery rate was 58.5% in the case of injection of the aqueous sol of Example 1, the salt water, and carbon dioxide; the crude oil recovery rate was 61.6% in the case of injection of the aqueous sol of Example 2, the salt water, and carbon dioxide; and the crude oil recovery rate was 50.5% in the case of injection of only carbon dioxide.

TABLE 8

Sandstone (BSS) Core Sample, Crude Oil Recovery Rate

| Comparative Example | | Example 1 $CO_2$ foam Crude oil | | Example 2 $CO_2$ foam Crude oil | |
|---|---|---|---|---|---|
| Volume ratio of injected fluid to pores: PV | $CO_2$ Crude oil recovery rate (%) | Volume ratio of injected fluid to pores: PV | recovery rate (%) Example 1 (GPS type) | Volume ratio of injected fluid to pores: PV | recovery rate (%) Example 2 (APTES type) |
| 0.00 | 0.0 | 0.00 | 0.0 | 0.00 | 0.0 |
| 0.16 | 10.1 | 0.10 | 8.6 | 0.08 | 9.8 |
| 0.26 | 15.2 | 0.21 | 16.8 | 0.21 | 23.9 |
| 0.35 | 19.6 | 0.33 | 24.4 | 0.34 | 35.6 |
| 0.44 | 25.5 | 0.45 | 32.0 | 0.47 | 43.3 |
| 0.54 | 29.2 | 0.57 | 39.2 | 0.60 | 49.2 |
| 0.63 | 32.7 | 0.69 | 47.7 | 0.73 | 55.0 |
| 0.72 | 36.5 | 0.80 | 54.2 | 0.86 | 57.3 |
| 0.82 | 39.4 | 0.92 | 56.3 | 0.99 | 59.2 |
| 0.91 | 42.5 | 1.04 | 57.2 | 1.12 | 60.6 |
| 1.09 | 48.1 | 1.16 | 58.1 | 1.20 | 61.6 |
| 1.20 | 50.5 | 1.20 | 58.5 | — | — |

Test Example 2: Crude Oil Recovery Test Using Carbonate Rocks (IN 200 md)

A carbonate rock (IN 200md) core sample (one sample) inserted in a rubber sleeve was placed in the core holder shown in FIG. 17, and the pores of the carbonate rock (IN 200md) core were vacuumed, followed by vacuuming of the annular space between the rubber sleeve and the inner wall of the core holder (annular space for fluid charging by confining pressure (lateral pressure)). Afterwards, the annular space was saturated with a pressurized fluid from the confining pressure pump by atmospheric pressure suction, the confining pressure (lateral pressure) was increased to 68.0 atm with the confining pressure pump, to thereby determine that there was no leakage into the pores of the carbonate rock (IN 200md) core and to the exterior. The back pressure valve was set to 200 atm (i.e., test conditions) with the back pressure pump. The injection pump 2 was connected to the crude oil piston cylinder, and the crude oil was introduced into the vacuumed pores of the carbonate rock (IN 200md) core, followed by pressurization to 34.0 atm and control of the pump at constant pressure. In order to achieve the differential pressure set for the crude oil recovery evaluation test (back-pressure setting pressure+ 68.0 atm (1,000 psi)), the confining pressure (lateral pressure) was increased to 102.0 atm, and the amount of the introduced crude oil was recorded. The preliminarily measured dead volume between the upstream and downstream valves of the core holder was subtracted from the amount of the introduced crude oil at a differential pressure of 68.0 atm, to thereby determine the 100% crude oil saturation volume of the core pores, which was used as the core pore volume for calculation of the crude oil recovery rate. While determining that there was no leakage, the confining pressure (lateral pressure) and then the pressure in the core pores were increased in increments of 34.0 atm, and the confining pressure (lateral pressure) and the pressure in the core pores were set to 268.1 atm and 200.0 atm (test pressures), respectively. The injection pump 2 was set to constant flow rate control, and the crude oil was injected at a low flow rate, to thereby determine the operation of the back pressure valve and the signal output status of the pressure transducer. The upstream valve of the crude oil piston cylinder was closed, and the internal pressure of the piston cylinder for fluid charging was controlled at a constant pressure of 200 atm by the injection pumps 1 and 2. The air thermostatic chamber was heated from room temperature in increments of 10° C., and the temperature of the air thermostatic chamber was maintained at 100° C. (test temperature). Regarding the fluid expansion volume during an increase in temperature, the internal pressure of the piston cylinder for fluid charging was maintained at 200 atm by the injection pumps 1 and 2, the crude oil in the core holder was discharged from the back pressure valve and maintained at 200 atm, and the confining pressure (lateral pressure) was maintained at 268.1 atm by the confining pressure pump.

Subsequently, the liquid prepared with salt water (silica concentration: 1.0% by mass, salt concentration: 229,000 ppm (salt water of high salt concentration)) containing the aqueous sol of Example 1 (silica sol containing silica particles subjected to surface treatment with 3-glycidoxypropyltrimethoxysilane (GPS)) was injected from the piston cylinder for nanoparticles and salt water, and carbon dioxide was injected from the $CO_2$ piston cylinder. The salt water-prepared liquid and carbon dioxide were simultaneously injected at a ratio of 1:1 at a flow rate of 4 feet/day into the carbonate rock (IN 200md) core sample saturated with the crude oil in the core holder. For Comparative Test Example, only carbon dioxide was injected at a flow rate of 4 feet/day into the core sample saturated with the crude oil. The injection fluid was injected into the core sample at 100° C., a back-pressure control pressure of 200 atm, and a confining pressure (lateral pressure) of 268.1 atm. The injection was performed until the volume of the injection fluid reacted 120% relative to the pore volume of the core sample.

The crude oil recovery rate was calculated from the amount of the crude oil recovered from the pores of the carbonate rock (IN 200md) core sample by the injection of the injection fluid (the aqueous sol of Example 1, the salt water, and carbon dioxide) into the core sample. The results are shown in FIG. 19 and Table 9.

Figure 19:
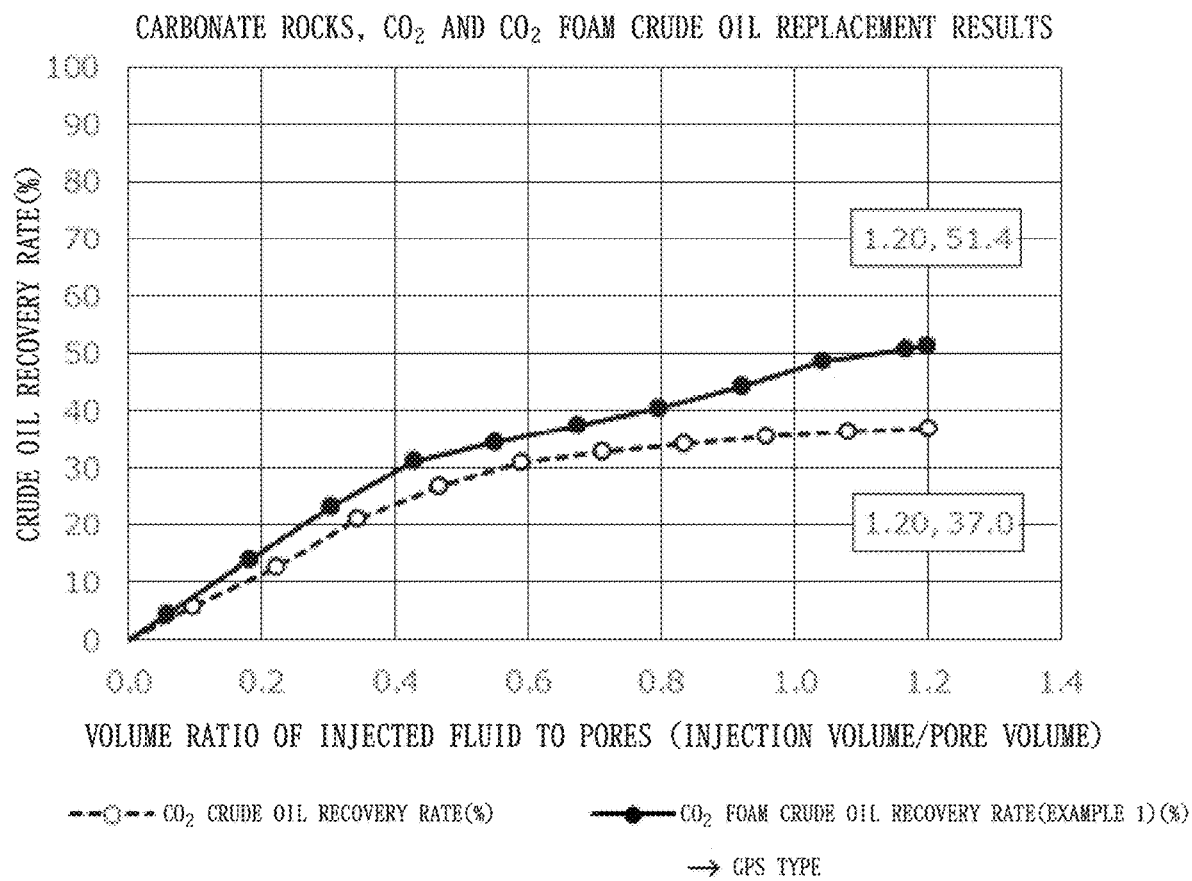
FIG. 19 shows the amount (%) of crude oil (vertical axis) recovered from pores of a carbonate rock (IN 200md) core sample with respect to the amount of injection (horizontal axis) of a fluid (salt water containing the aqueous sol (silica concentration: 1.0% by mass), carbon dioxide) when the total rock pore volume of the core sample is taken as 1.0.

FIG. 19 and Table 9 show the amount of injection (the volume ratio of the injected fluid to the pores (injection volume/pore volume):PV) of the fluid (the aqueous sol of Example 1, the salt water, and carbon dioxide) (corresponding to the horizontal axis), and the amount (%) of the crude oil recovered from the pores of the carbonate rock (IN 200md) core sample (corresponding to the vertical axis) when the total rock pore volume of the core sample is taken as 1.0. In FIG. 19, the symbol "●" corresponds to the results of simultaneous injection of the salt water (salt concentration: 229,000 ppm) containing the aqueous sol of Example 1 (silica sol containing silica particles subjected to surface treatment with 3-glycidoxypropyltrimethoxysilane (GPS)) and carbon dioxide at a ratio of 1:1 at a flow rate of 4 feet/day, and the symbol "○" corresponds to the results of injection of only carbon dioxide at a flow rate of 4 feet/day.

As shown in FIG. 19 and Table 9, when the amount of injection of the fluid into the pores of the carbonate rock (IN 200md) core sample reached 1.20 (120%), the crude oil recovery rate was 51.4% in the case of injection of the aqueous sol of Example 1, the salt water, and carbon dioxide, and the crude oil recovery rate was 37.0% in the case of injection of only carbon dioxide.

TABLE 9

Carbonate Rock (IN 200 md) Core Sample, Crude Oil Recovery Rate

| Comparative Example | | Example 1 | |
| --- | --- | --- | --- |
| Volume ratio of injected fluid to pores: PV | $CO_2$ Crude oil recovery rate (%) | Volume ratio of injected fluid to pores: PV | $CO_2$ foam Crude oil recovery rate (%) |
| 0.00 | 0.0 | 0.00 | 0.0 |
| 0.10 | 5.7 | 0.06 | 4.4 |
| 0.22 | 12.5 | 0.18 | 14.0 |
| 0.34 | 21.1 | 0.30 | 23.1 |
| 0.47 | 26.8 | 0.43 | 31.2 |
| 0.59 | 31.0 | 0.55 | 34.3 |
| 0.71 | 32.7 | 0.67 | 37.4 |
| 0.83 | 34.3 | 0.80 | 40.4 |
| 0.96 | 35.5 | 0.92 | 44.2 |
| 1.08 | 36.4 | 1.04 | 48.5 |
| 1.20 | 37.0 | 1.20 | 51.4 |

Test Example 3: Test for Determining Presence of Rock Core Pore Blockage by Aqueous Sol (Example 1) Using Sandstone (BSS)

The aqueous sol of Example 1 was used to prepare a sample having a medium salt concentration (175,000 ppm), a silica concentration of 1.0% by mass, and a pH of 6.3 in the same manner as described in [Salt Water Stability Test]. The sample was stored at 80° C. for seven days, and then the sample was tested for determining whether or not it blocks pores of a rock core.

Figure 20:
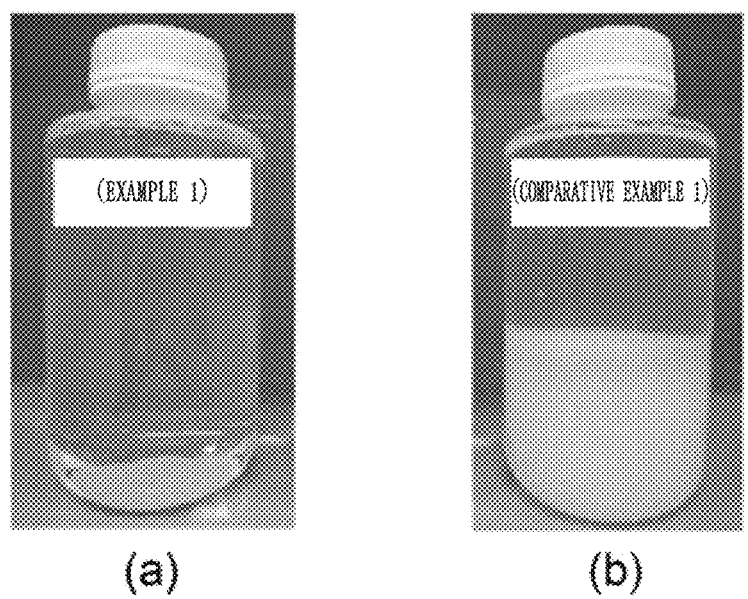
FIG. 20 is a photograph of a sample prepared by using the aqueous sol of Example 1 (medium salt concentration: 175,000 ppm, silica concentration: 1.0% by mass) (pH 6.3) (FIG. 20(a)), and a sample prepared by using the aqueous sol of Comparative Example 1 (medium salt concentration: 175,000 ppm, silica concentration: 1.0% by mass) (pH 7.2) (FIG. 20(b)), wherein the photograph shows the states of the samples after being stored at 80° C. for seven days.

FIG. 20(a) shows a sample (using the aqueous sol of Example 1) used in the present test. It was visually confirmed that the silica particles of the aqueous sol dispersed uniformly and did not precipitate.

The aqueous sol prepared through the procedure of Example 1 as described above was added to salt water (medium salt concentration (175,000 ppm, pH 6.3)) so as to achieve a silica concentration of 1.0% by mass, and the mixture was stored at 80° C. for seven days, to prepare a sample. Through the procedure described below, a test for determining presence of rock core pore blockage (assuming subsurface oil reservoir) was performed by using the core pore blockage test apparatus (pipe and equipment layout) shown in FIG. 21 and using a rock core sample (sandstone, BSS-4) saturated with the sample and distilled water.

Figure 21:
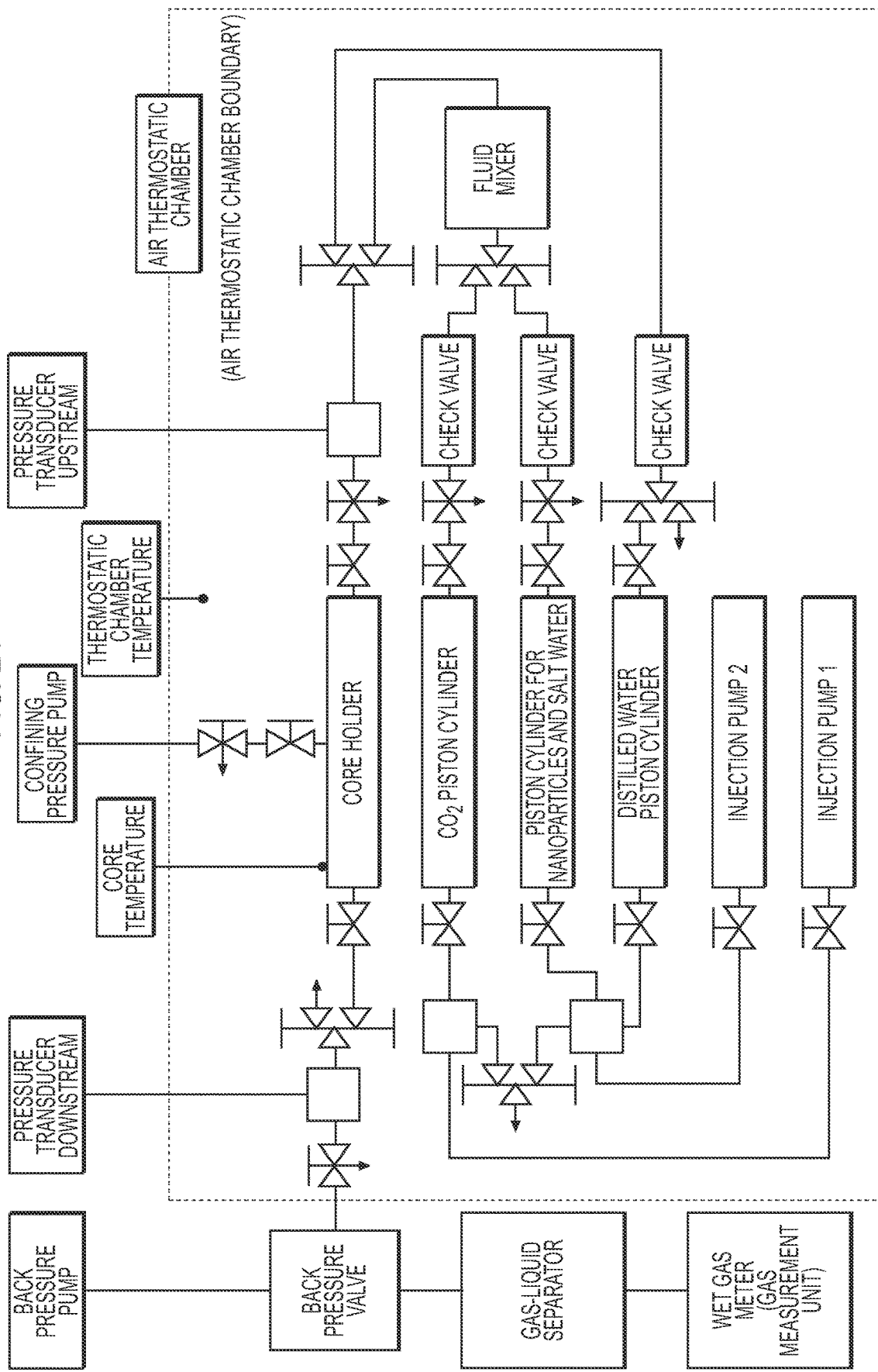
FIG. 21 shows the structure of an apparatus used in a test for determining presence of pore blockage within the core.

As shown in FIG. 21, the core flow test apparatus includes injection pumps (available from Schlumberger), a $CO_2$ piston cylinder for fluid charging, a piston cylinder for nanoparticles and salt water, and a distilled water piston cylinder (available from VINCI Technologies), a core holder (available from VINCI Technologies), a confining pressure pump (available from VINDUM ENGINEERING), a back pressure valve and a back pressure pump (available from VINCI Technologies), a gas-liquid separator for a recovered fluid (available from VINCI Technologies), a wet gas meter for measuring the amount of free gas (available from Shinagawa Corporation), a pressure transducer (available from VALCOM), a resistance thermometer bulb for measuring a core temperature, a thermostatic chamber temperature, and a free gas temperature (available from Chino Corporation), and an air thermostatic chamber (available from Sunaka Rika Kogyo K. K.). The upstream and downstream pressures of the core holder, the confining pressure (lateral pressure) of the core holder, the pressure for control of the back pressure valve, the temperatures of the core and the thermostatic chamber, and the amount and temperature of the free gas were recorded every second by a computer via a data logger (available from GRAPHTEC).

Test Example 3: Test for Determining Presence of Rock Core Pore Blockage by Aqueous Sol (Examples 1 and 2) Using Sandstone (BSS)

A sandstone (BSS) core sample (one sample) inserted in a rubber sleeve was placed in the core holder shown in FIG. 21, and the pores of the sandstone (BSS) core were vacuumed, followed by vacuuming of the annular space between the rubber sleeve and the inner wall of the core holder (annular space for fluid charging by confining pressure (lateral pressure)). After the annular space was saturated with a pressurized fluid from the confining pressure pump by atmospheric pressure suction, the confining pressure (lateral pressure) was increased to 68.0 atm with the confining pressure pump, to thereby determine that there is no leakage into the pores of the sandstone (BSS) core and to the exterior. The back pressure valve was set to 200 atm (i.e., test conditions) with the back pressure pump. The injection pump 2 was connected to the distilled water piston cylinder, and distilled water was introduced into the vacuumed pores of the sandstone (BSS) core, followed by pressurization to 34.0 atm and control of the pump at constant pressure. In order to achieve the differential pressure set for the blockage evaluation test (back-pressure setting pressure+68.0 atm (1,000 psi)), the confining pressure (lateral pressure) was increased to 102.0 atm, and the amount of the introduced distilled water was recorded. The preliminarily measured dead volume between the upstream and downstream valves of the core holder was subtracted from the amount of the introduced distilled water at a differential pressure of 68.0 atm, to thereby determine the 100% distilled water saturation volume of the core pores, which was used as the core pore volume for calculation of the amount of injection (the volume ratio of the injected fluid to the pores (injection volume/pore volume):PV). While determining that there is no leakage, the confining pressure (lateral pressure) and then the pressure in the core pores were increased in increments of 34.0 atm, and the confining pressure (lateral pressure) and the pressure in the core pores were set to 268.1 atm and 200.0 atm (test pressures), respectively. The injection pump 2 was set to constant flow rate control, and the distilled water was injected at a low flow rate, to thereby determine the operation of the back pressure valve and the signal output status of the pressure transducer. The upstream valve of the distilled water piston cylinder was closed, and the internal pressure of the piston cylinder for fluid charging was controlled at a constant pressure of 200 atm by the injection pumps 1 and 2. The air thermostatic chamber was heated from room temperature in increments of 10° C., and the temperature of the air thermostatic chamber was maintained at 100° C. (test temperature). Regarding the fluid expansion volume during an increase in temperature, the internal pressure of the piston cylinder for fluid charging was maintained at 200 atm by the injection pumps 1 and 2, the distilled water in the core holder was discharged from the back pressure valve and maintained at 200 atm, and the confining pressure (lateral pressure) was maintained at 268.1 atm by the confining pressure pump.

Subsequently, the liquid prepared with salt water (silica concentration: 1.0% by mass, salt concentration: 175,000 ppm (salt water of medium salt concentration)) containing the aqueous sol of Example 1 (silica sol containing silica particles subjected to surface treatment with 3-glycidoxypropyltrimethoxysilane (GPS)) was injected from the piston cylinder for nanoparticles and salt water, and carbon dioxide was injected from the $CO_2$ piston cylinder. The salt water-prepared liquid and carbon dioxide were simultaneously injected at a ratio of 1:1 at a flow rate of 4 feet/day into the sandstone (BSS) core sample saturated with the distilled water in the core holder. The injection fluid was injected into the core sample at 100° C., a back-pressure control pressure of 200 atm, and a confining pressure (lateral pressure) of 268.1 atm. While the injection differential pressure (fluid flow differential pressure at a flow rate of 4 feet/day) was measured, the injection process was continued until completion of injection of the entire amount of the liquid prepared with salt water (silica concentration: 1.0% by mass, salt concentration: 175,000 ppm (salt water of medium salt concentration)) containing the aqueous sol of Example 1 (silica sol containing silica particles subjected to surface treatment with 3-glycidoxypropyltrimethoxysilane (GPS)) charged in the piston cylinder and automatic stop of the injection pump 2 in association with an increase in the pressure of the pump 2 to 234 atm (i.e., upper limit setting value of pump pressure). When the fluid flows out of the back pressure valve and the differential pressure decreases to 0 atm (the upstream pressure of the sandstone (BSS) core sample–the downstream pressure thereof) after completion of the injection, the core is determined not to be blocked, whereas when the differential pressure is maintained at 234 atm (i.e., upper limit setting value of pump pressure) (the upstream pressure of the sandstone (BSS) core sample–the downstream pressure thereof) after completion of the injection, the core is determined to be blocked. When the core is determined not to be blocked, and the injection differential pressure increases upon simultaneous injection of the salt water-prepared liquid from the piston cylinder for nanoparticles and salt water and carbon dioxide from the $CO_2$ piston cylinder at a ratio of 1:1, the apparent viscosity of the injection fluid is suggested to be increased, and $CO_2$ foam is expected to be formed.

The injection differential pressure of the fluid flowed through the pores of the sandstone (BSS) core sample by the injection of the injection fluid (the aqueous sol of Example 1, the salt water, and carbon dioxide) into the core sample was measured. The results are shown in FIG. 22 and Table 10.

The term "injection differential pressure" as used herein refers to the difference between the primary pressure (upstream pressure) and the secondary pressure (downstream pressure) during flow of the fluid. In the flow test, the injection differential pressure corresponds to the difference between the pressures measured on the upstream and downstream sides of the core sample inserted in the core holder during flow of the fluid (i.e., injection (flow) differential pressure=the upstream pressure–the downstream pressure). When the injection flow rate is constant, the injection differential pressure is low in a core of high permeability, and the injection differential pressure is higher in a core of low permeability. In the case of a single core (i.e., constant permeability), high injection flow rate of a fluid leads to high differential pressure, and low injection flow rate leads to low differential pressure. In the case of a constant flow rate, injection of a fluid of high viscosity leads to high differential pressure, and injection of a fluid of low viscosity leads to low differential pressure.

Figure 22:
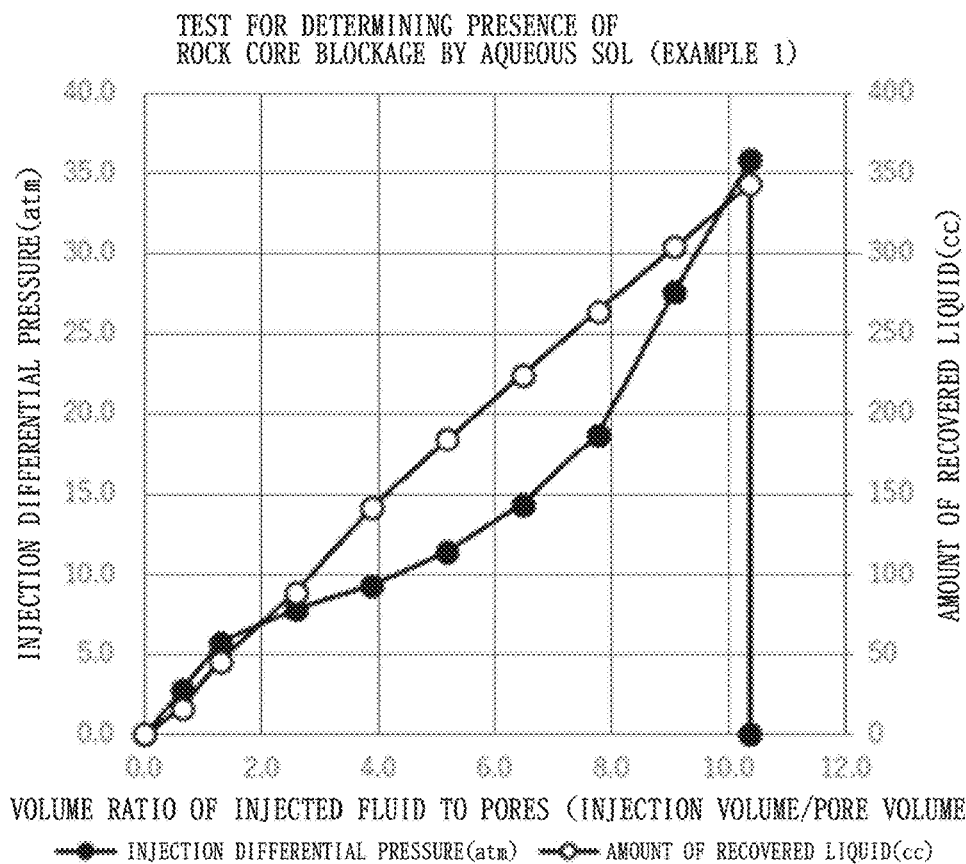
FIG. 22 shows the injection differential pressure (left vertical axis) and the amount (cc) of salt water (containing the aqueous sol) (right vertical axis) recovered from pores of a sandstone (BSS) core sample with respect to the amount of injection (horizontal axis) of a fluid (stored salt water sample (medium salt concentration) containing the aqueous sol (silica concentration: 1.0% by mass), carbon dioxide) when the total rock pore volume of the core sample is taken as 1.0 in a test for determining presence of pore blockage within the core using the aqueous sol of Example 1.

FIG. 22 shows the amount of injection (the volume ratio of the injected fluid to the pores (injection volume/pore volume):PV) of the fluid (sample prepared by storage (at 80° C. for seven days) of the salt water (silica concentration: 1.0% by mass, salt concentration: 175,000 ppm (salt water of medium salt concentration)) containing the aqueous sol of Example 1 (silica sol containing silica particles subjected to surface treatment with 3-glycidoxypropyltrimethoxysilane (GPS)), carbon dioxide) (corresponding to the horizontal axis), and the injection differential pressure (corresponding to the left vertical axis) and the amount (cc) of the salt water (containing the aqueous sol) recovered from the pores of the sandstone (BSS) core sample (corresponding to the right vertical axis) when the total rock pore volume of the core sample is taken as 1.0. In FIG. 22, the symbol "●" corresponds to the injection differential pressure, and the symbol "○" corresponds to the amount of the recovered liquid.

Figure 23:
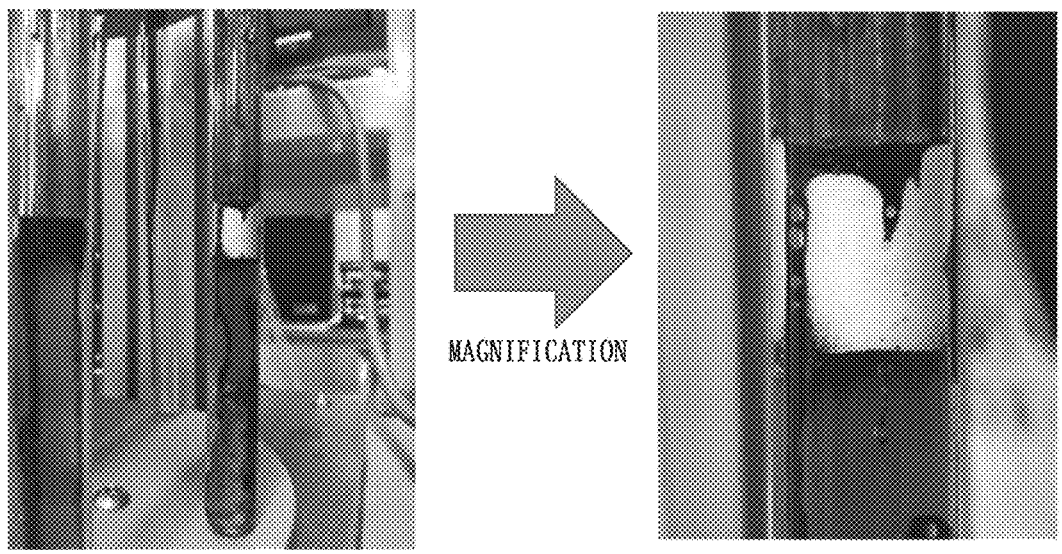
FIG. 23 is a photograph showing formation of froth in the recovered fluid in the test for determining presence of pore blockage within the core using the aqueous sol of Example 1

As shown in Table 10 and FIG. 22, an increase in the injection differential pressure suggested the formation of froth or emulsion in the interior of the rock core. Since the upstream pressure was reduced to the downstream pressure immediately after stop of the pump, and the differential pressure reached 0 atm, the core was determined not to be "blocked." FIG. 23 is a photograph showing formation of froth in the recovered fluid. The aqueous sol of Example 2 (silica sol containing silica particles subjected to surface treatment with 3-aminopropyltriethoxysilane (APTES) and phenyltrimethoxysilane (PTMS)) was also subjected to the test for determining presence of core blockage using the sandstone (BSS). The results are shown in FIG. 24 and Table 11.

Figure 24:
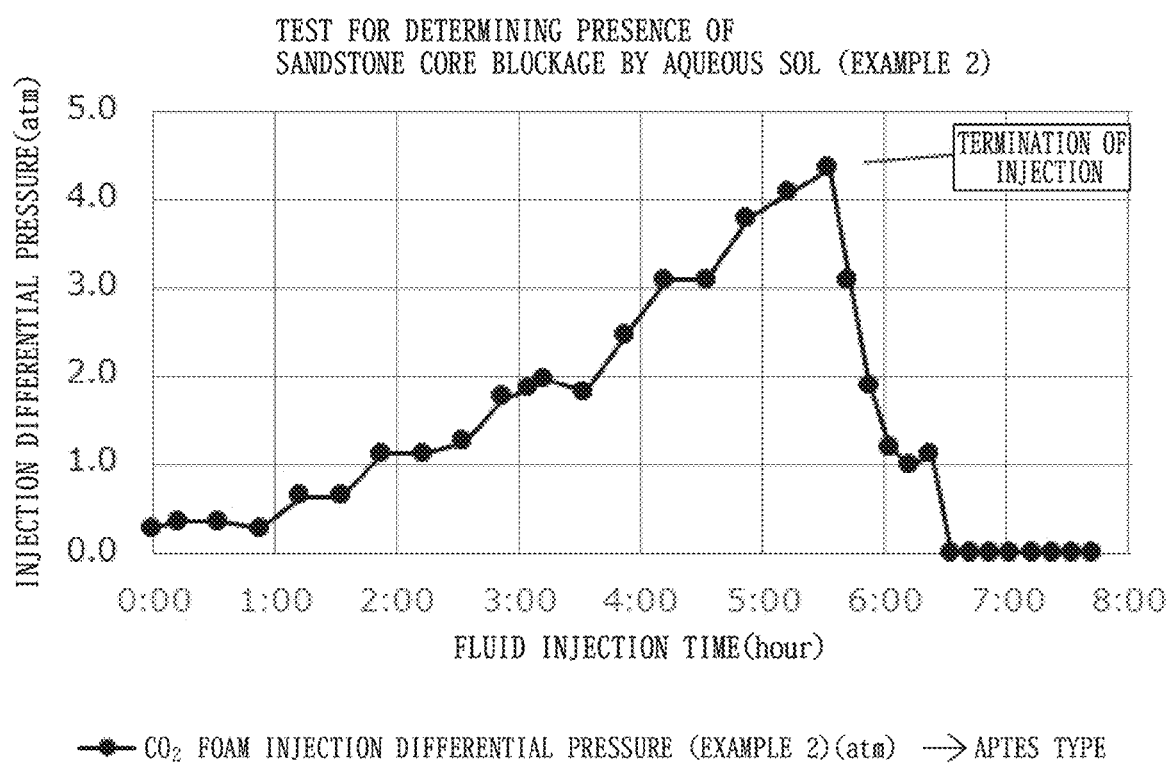
FIG. 24 shows the fluid injection pressure (vertical axis) with respect to the injection time (horizontal axis) in the case of continuous injection of a fluid (stored salt water sample (medium salt concentration) containing the aqueous sol (silica concentration: 1.0% by mass), carbon dioxide) when the total rock pore volume of a sandstone (BSS) core sample is taken as 1.0 in a test for determining presence of pore blockage within the core using the aqueous sol of Example 2.

FIG. 24 shows the injection time (hours) of the fluid (sample prepared by storage (at 80° C. for seven days) of the salt water (silica concentration: 1.0% by mass, salt concentration: 175,000 ppm (salt water of medium salt concentration)) containing the aqueous sol of Example 2 (silica sol containing silica particles subjected to surface treatment with 3-aminopropyltriethoxysilane (APTES) and phenyltrimethoxysilane (PTMS)), carbon dioxide) (corresponding to the horizontal axis), and the injection differential pressure (corresponding to the vertical axis) when the total rock pore volume of the sandstone (BSS) core sample is taken as 1.0.

As shown in Table 11 and FIG. 24, a gradual increase in the injection differential pressure applied to the sandstone core was determined after initiation of the fluid injection. 5.42 Hours after initiation of the fluid injection, the experimental operation was terminated; i.e., the injection was terminated by stop of the pump. Thereafter, a gradual decrease in the differential pressure applied to the sandstone core was determined. A gradual decrease in the pressure was determined immediately after stop of the pump before the differential pressure reached 0 atm. Such "mild blockage" caused no problem in practice.

TABLE 10

Sandstone (BSS) Core Sample/Test for Determining
Presence of Rock Core Blockage (Example 1)

| Volume ratio of injected fluid to pores (PV) | Injection differential pressure (atm) | Amount of recovered liquid (cc) |
| --- | --- | --- |
| 0.00 | 0.0 | 0.00 |
| 0.65 | 2.7 | 16.20 |
| 1.30 | 5.7 | 45.70 |
| 2.59 | 7.8 | 88.95 |
| 3.89 | 9.3 | 142.00 |
| 5.18 | 11.4 | 183.75 |
| 6.48 | 14.4 | 224.00 |
| 7.77 | 18.7 | 264.00 |
| 9.07 | 27.6 | 304.25 |
| 10.36 | 35.8 | 343.00 |
| 10.36 | 0.0 | — |

TABLE 11

Sandstone (BSS) Core Sample/Test for Determining
Presence of Sandstone Core Blockage (Example 2)/
Piston Cylinder Injection Pump of Salt Water Containing
Silica Nanoparticles/Transition of Pressure

| Fluid Injection time (hours) | Injection differential pressure (atm) | Fluid Injection time (hours) | Injection differential pressure (atm) |
| --- | --- | --- | --- |
| 0.00 | 0.3 | 4.52 | 3.8 |
| 0.12 | 0.4 | 5.12 | 4.1 |
| 0.32 | 0.4 | 5.32 | 4.4 |
| 0.52 | 0.3 | 5.42 | 3.1 |
| 1.12 | 0.6 | 5.52 | 1.9 |
| 1.32 | 0.6 | 6.02 | 1.2 |
| 1.52 | 1.1 | 6.12 | 1.0 |
| 2.12 | 1.1 | 6.22 | 1.1 |
| 2.32 | 1.3 | 6.32 | 0.0 |
| 2.52 | 1.8 | 6.42 | 0.0 |
| 3.05 | 1.9 | 6.52 | 0.0 |
| 3.12 | 2.0 | 7.02 | 0.0 |
| 3.32 | 1.8 | 7.12 | 0.0 |
| 3.52 | 2.5 | 7.22 | 0.0 |
| 4.12 | 3.1 | 7.32 | 0.0 |
| 4.32 | 3.1 | 7.42 | 0.0 |

Test Example 4: Test for Determining Presence of Rock Core Pore Blockage by Aqueous Sol (Comparative Example 1) Using Sandstone (BSS)

The aqueous sol of Comparative Example 1 was used to prepare a sample having a medium salt concentration (175,000 ppm), a silica concentration of 1.0% by mass, and a pH of 7.2 in the same manner as described in [Salt Water Stability Test]. The sample was stored at 80° C. for seven days, and then the sample was tested for determining whether or not it blocks pores of a rock core.

FIG. 20(b) shows a sample (using the aqueous sol of Comparative Example 1) used in the present test. It was visually confirmed that the silica particles of the aqueous sol aggregated and precipitated.

The aqueous sol prepared through the procedure of Comparative Example 1 as described above was added to salt water (medium salt concentration (175,000 ppm, pH 7.2)) so as to achieve a silica concentration of 1.0% by mass, and the mixture was stored at 80° C. for seven days, to prepare a sample. Through the same procedure as described in Test Example 3, a test for determining presence of rock core pore blockage (assuming subsurface oil reservoir) was performed by using the core pore blockage test apparatus (pipe and equipment layout) shown in FIG. 21 and using a rock core sample (sandstone, BSS-5) saturated with the sample and distilled water.

Figure 25:
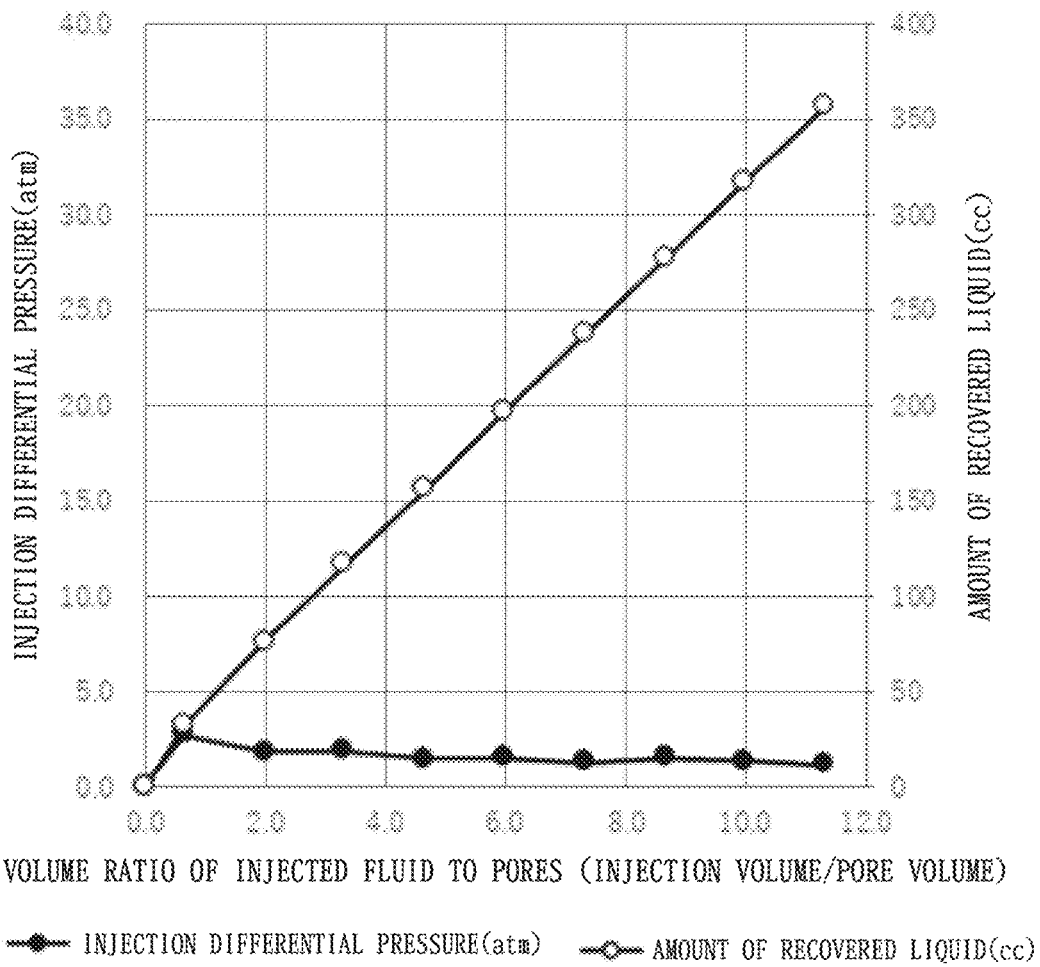
FIG. 25 shows the injection differential pressure (left vertical axis) and the amount (cc) of salt water (containing the aqueous sol) (right vertical axis) recovered from pores of a sandstone (BSS) core sample with respect to the amount of injection (horizontal axis) of a fluid (stored salt water sample (medium salt concentration) containing the aqueous sol (silica concentration: 1.0% by mass), carbon dioxide) when the total rock pore volume of the core sample is taken as 1.0 in a test for determining presence of pore blockage within the core using the aqueous sol of Comparative Example 1.

FIG. 25 shows the amount of injection (the volume ratio of the injected fluid to the pores (injection volume/pore volume):PV) of the fluid (sample prepared by storage (at 80° C. for seven days) of the salt water (silica concentration: 1.0% by mass, salt concentration: 175,000 ppm (salt water of medium salt concentration)) containing the aqueous sol of Comparative Example 1, carbon dioxide) (corresponding to the horizontal axis), and the injection differential pressure (corresponding to the left vertical axis) and the amount (cc) of the salt water (since an increase in the injection differential pressure was not measured and the differential pressure varied within a range of about 2 to 3 atm, it was assumed that the silica particles of the aqueous sol aggregated and precipitated in the piston cylinder for nanoparticles and salt water, and only the salt water was injected) recovered from the pores of the sandstone (BSS) core sample (corresponding to the right vertical axis) when the total rock pore volume of the core sample is taken as 1.0. In FIG. 25, the symbol "●" corresponds to the injection differential pressure, and the symbol "○" corresponds to the amount of the recovered liquid.

TABLE 12

Sandstone (BSS) Core Sample/Test for Determining
Presence of Rock Core Blockage (1)
(Comparative Example 1)

| Volume ratio of injected fluid to pores (PV) | Injection differential pressure (atm) | Amount of recovered liquid (cc) |
| --- | --- | --- |
| 0.00 | 0.0 | 0.00 |
| 0.67 | 2.8 | 32.50 |
| 2.00 | 1.8 | 76.50 |
| 3.33 | 1.9 | 116.75 |
| 4.67 | 1.5 | 156.75 |
| 6.00 | 1.6 | 196.75 |
| 7.33 | 1.3 | 237.25 |
| 8.66 | 1.6 | 277.25 |
| 10.00 | 1.4 | 317.25 |
| 11.33 | 1.2 | 357.25 |
| 12.00 | 0.9 | 391.00 |
| 12.66 | 0.7 | 429.00 |
| 13.33 | 0.6 | 458.50 |

As shown in Table 12 and FIG. 25, an increase in the injection differential pressure, which indicates formation of froth or emulsion in the interior of the rock core, was not measured.

The reason for this is probably attributed to the fact that the salt water containing the aqueous sol (Comparative Example 1) caused separation and precipitation of the silica component of the aqueous sol in the interior of the charged piston cylinder, and the silica component of the salt water containing the aqueous sol of Comparative Example 1 was gelatinized, whereby the silica component of the salt water containing the aqueous sol of Comparative Example 1 was not injected into the rock core sample. The aforementioned term "gelatinized" represents formation of gelatin composed of silica.

Figure 26:
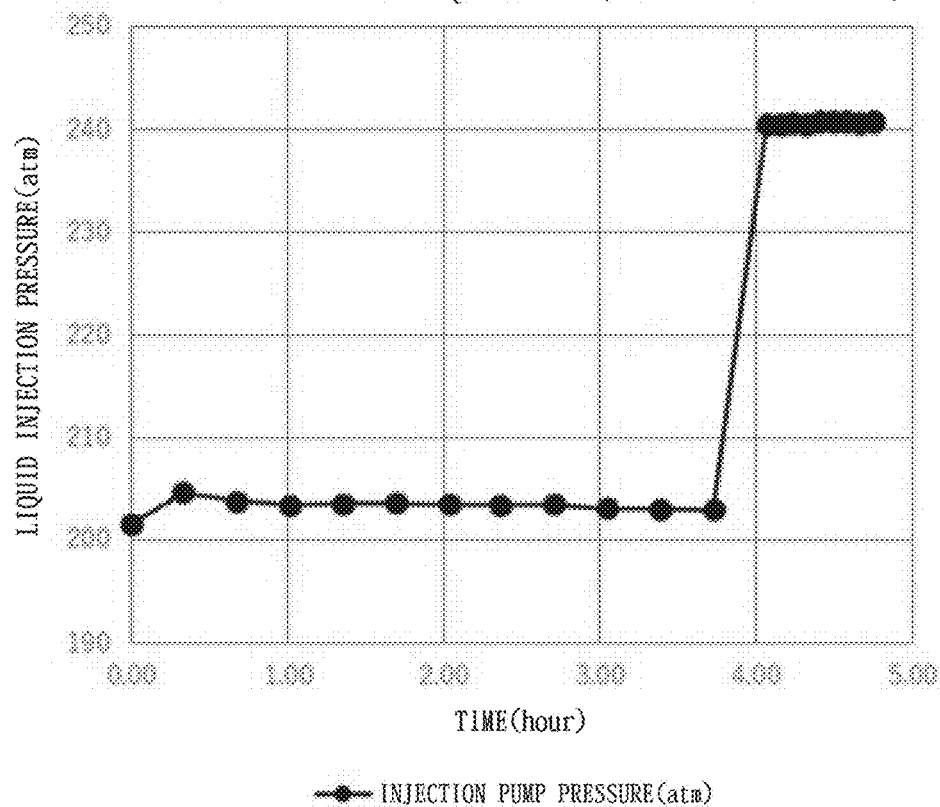
FIG. 26 shows the fluid injection pressure (vertical axis) with respect to the injection time (horizontal axis) in the case of continuous injection in the test for determining presence of pore blockage within the core using the aqueous sol of Comparative Example 1.

Thereafter, the injection was further continued, and as a result, a sudden increase in pressure was measured as shown in Table 13 (FIG. 26). FIG. 26 shows the fluid injection pressure (vertical axis) with respect to the injection time (horizontal axis). The results shown in Table 13 and FIG. 26 suggest that the silica component of the gelatinized aqueous sol (Comparative Example 1) started to be injected, as an injection fluid, into the pores of the rock core sample at the time when a sudden increase in pressure (after the elapse of 4.06 hours) was determined, but "blockage" of the pores occurred immediately after the start of the injection of gelatinized silica.

TABLE 13

Sandstone (BSS) Core Sample (Comparative Example 1)/
Test for Determining Presence of Rock Core Blockage (2)/
Piston Cylinder Injection Pump for Salt Water Containing
Silica Nanoparticles/Transition of Pressure

| Injection time (hours) | Injection pump, Transition of pressure (atm) |
| --- | --- |
| 0.00 | 201.6 |
| 0.33 | 204.7 |
| 0.67 | 203.9 |
| 1.01 | 203.5 |
| 1.35 | 203.6 |
| 1.69 | 203.7 |
| 2.03 | 203.6 |
| 2.37 | 203.5 |
| 2.71 | 203.6 |
| 3.05 | 203.2 |
| 3.38 | 203.1 |
| 3.72 | 203.0 |
| 4.06 | 240.5 |
| 4.15 | 240.5 |
| 4.24 | 240.7 |
| 4.32 | 240.6 |
| 4.41 | 240.8 |
| 4.49 | 240.8 |
| 4.57 | 240.9 |
| 4.66 | 240.7 |
| 4.74 | 240.8 |

Figure 27:
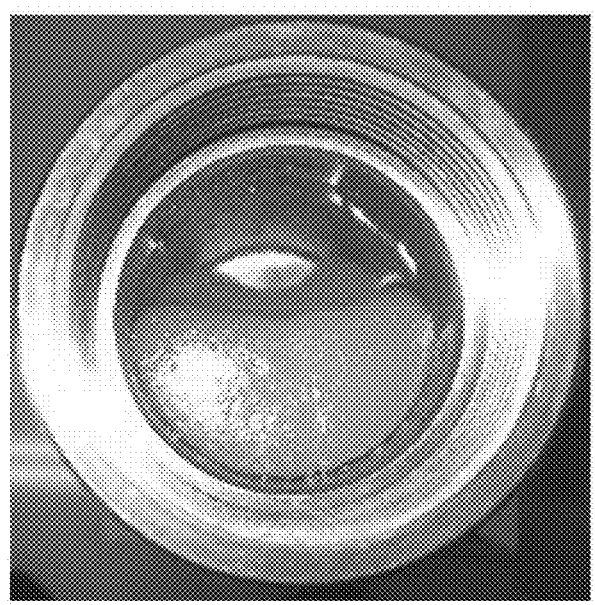
FIG. 27 is a photograph of a pipe of an apparatus used in the test for determining presence of pore blockage within the core using the aqueous sol of Comparative Example 1, wherein the photograph shows the state of the pipe after the test (formation of a gelatinized silica component).

FIG. 27 is a photograph showing the gelatinized silica component of the aqueous sol (Comparative Example 1) in the cylinder for the injection fluid, which was visually observed during dismantling of the blockage test apparatus (room temperature) after completion of the test performed by using the aqueous sol of Comparative Example 1. As shown in FIG. 27, the silica component of the aqueous sol (Comparative Example 1) can be determined to be gelatinized, which indicates that the aqueous sol failed to be injected into the rock core.

In the case of such gelatinization, the aqueous sol cannot be injected in the interior of the rock, and the gelatinization is likely to cause total loss of the permeability of the rock itself. However, as shown in the differential pressure behavior of the APTES-type aqueous sol of Example 2 (FIG. 24, Table 11), when blockage is mild enough not to result in total loss of the permeability, there is room to expect that the flow path of the injected fluid ($CO_2$ or $CO_2$ foam) can be changed in the rock to thereby improve the displacement efficiency.

The invention claimed is:

1. A crude oil recovery method for recovering crude oil from a subsurface hydrocarbon-containing reservoir, the method comprising:
   step (a): injecting an aqueous sol, water and carbon dioxide, each alternatingly or simultaneously, into a subsurface oil reservoir;
      wherein the aqueous sol comprises silica particles having an average particle diameter of 1 to 100 nm as measured by dynamic light scattering and having surfaces at least partially coated with a silane compound having a hydrolyzable group, wherein the hydrolyzable group is selected from the group consisting of an alkoxy group, an acyloxy group, and a halogen group, the silica particles serving as a dispersoid and being dispersed in an aqueous solvent having a pH of 1.0 or more to 6.0 or less serving as a dispersion medium; and
   step (b): following the injecting, recovering oil extracted by an oil production well drilled into the subsurface oil reservoir.

2. The crude oil recovery method according to claim 1, wherein the step (a) is a step of injecting the aqueous sol and water, and carbon dioxide alternatingly into the subsurface oil reservoir.

3. The crude oil recovery method according to claim 1, wherein the injection in the step (a) is performed at a temperature of 30 to 120° C. and a pressure of 70 to 400 atm.

4. The crude oil recovery method according to claim 1, wherein the subsurface oil reservoir contains sandstone.

5. The crude oil recovery method according to claim 1, wherein the subsurface oil reservoir contains carbonate rocks.

6. The crude oil recovery method according to claim 1, wherein the silane compound having the hydrolyzable group is selected from the group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(3,4-epoxycyclohexyl)propyltrimethoxysilane, 3-(3,4-epoxycyclohexyl)propyltriethoxysilane, 2-(3,4-epoxycyclohexyl)ethyltrimethoxysilane, 2-(3,4-epoxycyclohexyl)ethyltriethoxysilane, 1-(3,4-epoxycyclohexyl)methyltrimethoxysilane, 1-(3,4-epoxycyclohexyl)methyltriethoxysilane, [(3-ethyl-3-oxetanyl)methoxy]propyltrimethoxysilane and [(3-ethyl-3-oxetanyl)methoxy]propyltriethoxysilane, N-2-(aminoethyl)-3-aminopropylmethyldimethoxysilane, N-2-(aminoethyl)-3-aminopropyltrimethoxysilane, 3-aminopropyltrichlorosilane, 3-aminopropyltrimethoxysilane, 3-aminopropyltriethoxysilane, 3-aminopropylmethyldimethoxysilane, 3-aminopropylmethyldiethoxysilane, 3-triethoxysilyl-N-(1,3-dimethyl-butylidene)propylamine, N-phenyl-3-aminopropyltrimethoxysilane, and N-phenyl-3-aminopropyltriethoxysilane.

7. The crude oil recovery method according to claim 1, wherein the silane compound having a hydrolyzable group is a silane compound having, in addition to the hydrolyzable group, an epoxy group or an organic group produced by hydrolysis of the epoxy group.

8. The crude oil recovery method according to claim 7, wherein the epoxy group is a glycidyl group, a cyclohexylepoxy group, or a combination of these.

9. The crude oil recovery method according to claim 1, wherein the silane compound having a hydrolyzable group is a silane compound having, in addition to the hydrolyzable group, an amino group.

10. The crude oil recovery method according to claim 1, wherein the silane compound having a hydrolyzable group further contains a second silane compound having a hydrolyzable group.

11. The crude oil recovery method according to claim 10, wherein the second silane compound having a hydrolyzable group is a silane compound having an organic group containing a $C_{1-40}$ alkyl group, a $C_{6-40}$ aromatic ring group, or a combination of these.

* * * * *